United States Patent
Merlin et al.

(10) Patent No.: US 9,537,688 B2
(45) Date of Patent: Jan. 3, 2017

(54) METHODS AND APPARATUS FOR CLEAR CHANNEL ASSESSMENT

(71) Applicant: QUALCOMM Incorporated, San Diego, CA (US)

(72) Inventors: Simone Merlin, Solana Beach, CA (US); Bin Tian, San Diego, CA (US); Sameer Vermani, San Diego, CA (US); Eugene Jong-Hyon Baik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/321,331

(22) Filed: Jul. 1, 2014

(65) Prior Publication Data

US 2015/0009907 A1    Jan. 8, 2015

Related U.S. Application Data

(60) Provisional application No. 61/843,315, filed on Jul. 5, 2013.

(51) Int. Cl.
*H04B 15/00* (2006.01)
*H04L 27/00* (2006.01)
*H04W 74/08* (2009.01)

(52) U.S. Cl.
CPC ...... *H04L 27/0006* (2013.01); *H04W 74/0808* (2013.01)

(58) Field of Classification Search
CPC .................................. H04W 74/0808
See application file for complete search history.

(56) References Cited

U.S. PATENT DOCUMENTS

| 7,436,801 | B1 | 10/2008 | Kanterakis |
| 8,331,951 | B2 | 12/2012 | Zhang et al. |
| 8,355,389 | B2 | 1/2013 | Kasslin et al. |
| 8,498,578 | B2 | 7/2013 | Abraham et al. |
| 8,522,088 | B2 | 8/2013 | Kim et al. |
| 8,634,317 | B1 * | 1/2014 | Yu ............... H04L 47/10 370/252 |
| 2007/0002814 | A1 | 1/2007 | Benveniste |

(Continued)

FOREIGN PATENT DOCUMENTS

| EP | 2302964 A1 | 3/2011 |
| EP | 2490500 A1 | 8/2012 |

(Continued)

OTHER PUBLICATIONS

International Search Report and Written Opinion—PCT/US2014/045241—ISA/EPO—Oct. 1, 2014.

(Continued)

*Primary Examiner* — Jay P Patel
(74) *Attorney, Agent, or Firm* — Knobbe Martens Olson & Bear, LLP

(57) ABSTRACT

Systems and methods of clear channel assessment on a wireless network are disclosed. In one aspect, a method includes determining a clear channel assessment (CCA) threshold based on a first transmission bandwidth, performing a first back-off procedure based on the determined clear channel assessment threshold; and transmitting a first wireless message in response to a completion of the first back-off procedure.

16 Claims, 22 Drawing Sheets

(56) References Cited

U.S. PATENT DOCUMENTS

| | | |
|---|---|---|
| 2007/0060155 A1 | 3/2007 | Kahana et al. |
| 2007/0072638 A1 | 3/2007 | Yang et al. |
| 2007/0133489 A1 | 6/2007 | Ramesh et al. |
| 2007/0270102 A1 | 11/2007 | Zhu et al. |
| 2008/0125160 A1 | 5/2008 | Zhu |
| 2009/0207747 A1 | 8/2009 | Kim et al. |
| 2011/0030516 A1 | 2/2011 | Hodges, Jr. |
| 2011/0110340 A1 | 5/2011 | Lakkis |
| 2011/0194644 A1 | 8/2011 | Liu et al. |
| 2011/0305156 A1 | 12/2011 | Liu et al. |
| 2011/0305288 A1 | 12/2011 | Liu et al. |
| 2012/0082109 A1 | 4/2012 | Hong et al. |
| 2012/0093134 A1 | 4/2012 | Zuniga et al. |
| 2012/0099450 A1 | 4/2012 | Madan et al. |
| 2012/0182963 A1 | 7/2012 | Kneckt et al. |
| 2012/0195296 A1 | 8/2012 | Adachi et al. |
| 2012/0207036 A1 | 8/2012 | Ong et al. |
| 2012/0207074 A1 | 8/2012 | Kneckt |
| 2012/0230242 A1 | 9/2012 | Kim et al. |
| 2012/0314583 A1 | 12/2012 | Hart et al. |
| 2012/0327870 A1 | 12/2012 | Grandhi et al. |
| 2013/0017794 A1 | 1/2013 | Kloper et al. |
| 2013/0051260 A1 | 2/2013 | Liu |
| 2013/0058218 A1 | 3/2013 | Wu et al. |
| 2013/0070627 A1 | 3/2013 | Chen et al. |
| 2013/0083781 A1 | 4/2013 | Zhang et al. |
| 2013/0136013 A1 | 5/2013 | Kneckt et al. |
| 2013/0171999 A1 | 7/2013 | Katar et al. |
| 2013/0182784 A1 | 7/2013 | Wang et al. |
| 2013/0203429 A1 | 8/2013 | Kneckt et al. |
| 2013/0235737 A1 | 9/2013 | Merlin et al. |
| 2013/0316660 A1* | 11/2013 | Hsin ............... H04W 74/0808 455/73 |
| 2014/0050156 A1 | 2/2014 | Chan et al. |
| 2014/0064101 A1 | 3/2014 | Hart et al. |
| 2014/0071873 A1 | 3/2014 | Wang et al. |
| 2014/0119268 A1 | 5/2014 | Chu et al. |
| 2014/0177517 A1 | 6/2014 | Koskela et al. |
| 2014/0269544 A1 | 9/2014 | Zhu et al. |
| 2014/0328191 A1* | 11/2014 | Barriac ............... H04W 52/241 370/252 |
| 2014/0328192 A1 | 11/2014 | Barriac et al. |
| 2014/0328268 A1 | 11/2014 | Zhu et al. |
| 2014/0328269 A1 | 11/2014 | Zhu et al. |
| 2014/0328270 A1 | 11/2014 | Zhu et al. |
| 2014/0334387 A1 | 11/2014 | Doppler et al. |
| 2015/0055587 A1 | 2/2015 | Sampath et al. |
| 2015/0078299 A1 | 3/2015 | Barriac et al. |
| 2015/0124744 A1 | 5/2015 | Zhu et al. |
| 2015/0131641 A1 | 5/2015 | Ong et al. |
| 2015/0201401 A1 | 7/2015 | Lahetkangas et al. |
| 2015/0319700 A1 | 11/2015 | Oteri et al. |
| 2016/0066349 A1* | 3/2016 | Seok ............... H04W 24/02 370/338 |

FOREIGN PATENT DOCUMENTS

| | | |
|---|---|---|
| WO | WO-2006115823 A2 | 11/2006 |
| WO | WO-2007027442 A2 | 3/2007 |
| WO | WO-2011053775 A1 | 5/2011 |
| WO | WO-2013012263 A1 | 1/2013 |
| WO | WO-2013012807 A1 | 1/2013 |

OTHER PUBLICATIONS

Merlin S., et al., "Systems and Methods for Extending the Range of Wireless Communications," U.S. Appl. No. 61/722,008, filed Nov. 2, 2012, pp. 48.

Charfi E. et al., "Upcoming WLANs MAC access mechanisms: An overview", Communication Systems, Networks&Digital Signal Processing (CSNDSP), 2012 8th International Symposium on, IEEE, Jul. 18, 2012 (Jul. 18, 2012), pp. 1-6, XP032237054.

* cited by examiner

METHODS AND APPARATUS FOR CLEAR CHANNEL ASSESSMENT

CROSS-REFERENCE TO RELATED APPLICATIONS

This application claims the benefit of U.S. Provisional Application No. 61/843,315, filed Jul. 5, 2013, and entitled "METHODS AND APPARATUS FOR CLEAR CHANNEL ASSESSMENT" and assigned to the assignee hereof. The disclosure of this prior application is considered part of this application, and is hereby incorporated by reference in its entirety.

BACKGROUND

Field

The present application relates generally to wireless communications, and more specifically to systems, methods, and devices for channel-dependent clear channel assessment evaluation procedures.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow tuning of medium access parameters.

One aspect disclosed is a method of clear channel assessment on a wireless network. The method includes performing a first back-off procedure based on a transmit power level, and transmitting the wireless message at the transmit power level in response to a completion of the first back-off procedure. In some aspects, the first back-off procedure includes determining a first energy threshold based on the transmit power, and determining whether a transmission channel is available based at least in part on the first energy threshold. In some of these aspects, the first back-off procedure further includes determining whether a packet is detected on the transmission channel, and determining whether the transmission channel is available based at least in part on whether a Wi-Fi packet is detected.

Some aspects of the method further include determining a transmission bandwidth for the wireless message, and determining the transmit power based on the transmission bandwidth. In some aspects of the method, the first back-off procedure is based on the transmission bandwidth, and the method further includes in response to completion of the first back-off procedure, determining an availability of a second transmission bandwidth, wherein the wireless message is transmitted at the second transmission bandwidth if the wireless medium is available, and performing a second back-off procedure if the wireless medium is not available.

In some aspects of the method, the first back-off procedure includes performing at least two sub-back-off procedures in parallel, each sub-back-off procedure based on a different transmission bandwidth, in response to a first sub-back-off procedure of the at least two sub-back-off procedures reaching a first completion threshold, determining whether a first transmission bandwidth corresponding to the first sub-back-off procedure is available during a time period, and wherein the wireless message is transmitted over the first transmission bandwidth if it is available during the time period.

In some of these aspects, the first back-off procedure further includes in response to a second of the at least two sub-back-off procedures reaching a second completion threshold, determining whether a second transmission bandwidth corresponding to the second sub-back-off procedure is available during a time period, and wherein the wireless message is transmitted over the second transmission bandwidth if it is available during the time period. In some aspects, the time period is a PIFS time period.

In some aspects of the method, performing a first back-off procedure includes performing a back-off procedure based on a first transmission bandwidth, in response to completion of the back-off procedure, determining if the first transmission bandwidth is available, wherein the wireless message is transmitted at the first transmission bandwidth with a first power level if the first transmission bandwidth is available, and wherein the wireless message is transmitted at a transmission bandwidth lower than the first transmission bandwidth, and at a power level lower than the first power level if the first transmission bandwidth is not available.

In some aspects of the method, performing a first back-off procedure includes performing a first sub-back-off based on a first transmission bandwidth, and after completion of the first sub-back-off procedure, performing a second sub-back off procedure based on a second transmission bandwidth wider than the first bandwidth, where the wireless message is transmitted at the second transmission bandwidth in response to completion of the second sub-back-off procedure.

In some of these aspects, the first sub-back-off procedure is based on a measurement of energy over the first transmission bandwidth relative to the first energy detection threshold.

In some aspects of the method, performing a first back-off procedure includes performing a first sub-back-off procedure based on a first transmission bandwidth, in response to completion of the first sub-back-off procedure, determining whether the first transmission bandwidth is available, wherein the wireless message is transmitted at the first transmission bandwidth if it is available, if the first transmission bandwidth is not available, performing a second sub-back-off procedure based on a second transmission bandwidth lower than the first transmission bandwidth, and in response to completion of the second sub-back-off procedure, determining whether the second transmission bandwidth is available, wherein the wireless message is transmitted at the second transmission bandwidth if it is available.

In some aspects of the method, performing a first back-off procedure includes performing a first sub-back-off procedure based on a first transmission bandwidth and based on a first power level, and then in response to a completion of the first sub-back-off procedure, determining if a second transmission bandwidth wider than the first transmission bandwidth is available based on a second transmission power level higher than the first transmission power level, wherein the wireless message is transmitted at the second transmission bandwidth at a third power level below the second power level and above the first power level if the second transmission bandwidth is available, and wherein the wireless message is transmitted at the first transmission bandwidth and the first transmission power level if the second transmission bandwidth is not available.

In some of these aspects, the third power level is less than or equal to the first transmission bandwidth (dB)+(10*log10 (x1/x2) Db) where: x1=the first transmission bandwidth and x2=the second transmission bandwidth.

Another aspect disclosed is an apparatus for clear channel assessment on a wireless network. The apparatus includes a processor configured to perform a first back-off procedure based on a transmit power level; and a transmitter configured to transmit the wireless message at the transmit power level in response to a completion of the first back-off procedure.

In some aspects of the apparatus, the processor is further configured to perform the first back-off procedure by: determining a first energy threshold based on the transmit power; and determining whether a transmission channel is available based at least in part on the first energy threshold.

In some aspects of the apparatus, the processor is further configured to perform the first back-off procedure by: determining whether a packet is detected on the transmission channel; and determining whether the transmission channel is available based at least in part on whether a Wi-Fi packet is detected.

In some aspects of the apparatus, the processor is further configured to: determine a transmission bandwidth for the wireless message; and determine the transmit power based on the transmission bandwidth.

In some aspects of the apparatus, the first back-off procedure is based on the transmission bandwidth. In these aspects, the processor is further configured to: in response to completion of the first back-off procedure, determine an availability of a second transmission bandwidth, wherein the wireless message is transmitted at the second transmission bandwidth if the wireless medium is available, and perform a second back-off procedure if the wireless medium is not available.

In some aspects of the apparatus, the processor is further configured to perform the first back-off procedure by: performing at least two sub-back-off procedures in parallel, each sub-back-off procedure based on a different transmission bandwidth, in response to a first sub-back-off procedure of the at least two sub-back-off procedures reaching a first completion threshold, determining whether a first transmission bandwidth corresponding to the first sub-back-off procedure is available during a time period, and wherein the transmitter is further configured to transmit the wireless message over the first transmission bandwidth if it is available during the time period.

In some aspects of the apparatus, the processor is further configured to perform the first back-off procedure by: in response to a second of the at least two sub-back-off procedures reaching a second completion threshold, and determining whether a second transmission bandwidth corresponding to the second sub-back-off procedure is available during a time period. In these aspects, the transmitter is configured to transmit the wireless message over the second transmission bandwidth if it is available during the time period. In some of these aspects, the time period is a PIFS time period.

In some aspects of the apparatus, the processor is further configured to perform the first back-off procedure by: performing a back-off procedure based on a first transmission bandwidth, and, in response to completion of the back-off procedure, determining if the first transmission bandwidth is available. In these aspects, the transmitter is configured to transmit the wireless message at the first transmission bandwidth with a first power level if the first transmission bandwidth is available, and the transmitter is configured to transmit the wireless message at a transmission bandwidth lower than the first transmission bandwidth, and at a power level lower than the first power level if the first transmission bandwidth is not available.

In some aspects of the apparatus, the processor is further configured to perform a first back-off procedure by: performing a first sub-back-off based on a first transmission bandwidth; and after completion of the first sub-back-off procedure, performing a second sub-back off procedure based on a second transmission bandwidth wider than the first bandwidth. In these aspects, the transmitter is configured to transmit the wireless message at the second transmission bandwidth in response to completion of the second sub-back-off procedure. In some of these aspects, the processor is configured to base the first sub-back-off procedure on a measurement of energy over the first transmission bandwidth relative to the first energy detection threshold.

In some aspects of the apparatus the processor is further configured to perform a first back-off procedure by: performing a first sub-back-off procedure based on a first transmission bandwidth, and in response to completion of the first sub-back-off procedure, determining whether the first transmission bandwidth is available, wherein the transmitter is configured to transmit the wireless message at the first transmission bandwidth if it is available. In these aspects, if the first transmission bandwidth is not available, the processor is configured to perform a second sub-back-off procedure based on a second transmission bandwidth lower than the first transmission bandwidth; and in response to completion of the second sub-back-off procedure, determining whether the second transmission bandwidth is available. In these aspects, the transmitter is configured to transmit the wireless message at the second transmission bandwidth if it is available.

In some aspects of the apparatus, the processor is further configured to perform a first back-off procedure by: performing a first sub-back-off procedure based on a first transmission bandwidth and based on a first power level; in response to a completion of the first sub-back-off procedure, determining if a second transmission bandwidth wider than the first transmission bandwidth is available based on a second transmission power level higher than the first transmission power level. In these aspects, the transmitter is configured to transmit the wireless message at the second transmission bandwidth at a third power level below the second power level and above the first power level if the second transmission bandwidth is available. In these aspects, the transmitter is configured to transmit the wireless message at the first transmission bandwidth and the first transmission power level if the second transmission bandwidth is not available.

In some of these aspects, the processor is further configured to determine the third power level to be less than or equal to the first transmission bandwidth (dB)+(10*log10 (x1/x2) Db), where: x10=the first transmission bandwidth, x2=the second transmission bandwidth.

Another aspect disclosed is an apparatus for clear channel assessment on a wireless network. The apparatus includes means for performing a first back-off procedure based on a transmit power level, and means for transmitting the wireless message at the transmit power level in response to a completion of the first back-off procedure.

In some aspects of the apparatus, the means for performing the first back-off procedure is further configured to: determine a first energy threshold based on the transmit power; and determine whether a transmission channel is available based at least in part on the first energy threshold.

In some aspects of the apparatus, the means for performing the first back-off procedure is further configured to: determine whether a packet is detected on the transmission channel; and determine whether the transmission channel is available based at least in part on whether a Wi-Fi packet is detected.

Some aspects of the apparatus further include means for determining a transmission bandwidth for the wireless message; and means for determining the transmit power based on the transmission bandwidth.

In some aspects of the apparatus, the means for performing the first back-off procedure is configured to base the first back off procedure on the transmission bandwidth. In these aspects, the apparatus further comprises means for in response to completion of the first back-off procedure, determining an availability of a second transmission bandwidth, wherein the wireless message is transmitted at the second transmission bandwidth if the wireless medium is available, and means for performing a second back-off procedure if the wireless medium is not available.

In some aspects of the apparatus, the means for performing the first back-off procedure is further configured to: perform at least two sub-back-off procedures in parallel, each sub-back-off procedure based on a different transmission bandwidth, in response to a first sub-back-off procedure of the at least two sub-back-off procedures reaching a first completion threshold, determine whether a first transmission bandwidth corresponding to the first sub-back-off procedure is available during a time period. In these aspects, the means for transmitting the wireless message is configured to transmit the wireless message over the first transmission bandwidth if it is available during the time period.

In some aspects of the apparatus, the means for performing the first back-off procedure is further configured to: in response to a second of the at least two sub-back-off procedures reaching a second completion threshold, determining whether a second transmission bandwidth corresponding to the second sub-back-off procedure is available during a time period. In these aspects, the means for transmitting the wireless message is configured to transmit the wireless message over the second transmission bandwidth if it is available during the time period. In some aspects of the apparatus, the time period is a PIFS time period.

In some aspects of the apparatus, the means for performing a first back-off procedure is further configured to: perform a back-off procedure based on a first transmission bandwidth; in response to completion of the back-off procedure, determine if the first transmission bandwidth is available, wherein the means for transmitting the wireless message is configured to transmit the wireless message at the first transmission bandwidth with a first power level if the first transmission bandwidth is available. In these aspects, the means for transmitting the wireless message is configured to transmit the wireless message at a transmission bandwidth lower than the first transmission bandwidth, and at a power level lower than the first power level if the first transmission bandwidth is not available.

In some aspects of the apparatus, the means for performing a first back-off procedure is configured to perform a first sub-back-off based on a first transmission bandwidth; and after completion of the first sub-back-off procedure, perform a second sub-back off procedure based on a second transmission bandwidth wider than the first bandwidth. In these aspects, the means for transmitting the wireless message is configured to transmit the wireless message at the second transmission bandwidth in response to completion of the second sub-back-off procedure.

In some of these aspects, the means for performing the first back-off procedure is configured to base the first sub-back-off procedure on a measurement of energy over the first transmission bandwidth relative to the first energy detection threshold.

In some aspects of the apparatus, the means for performing a first back-off procedure is further configured to: perform first sub-back-off procedure based on a first transmission bandwidth; in response to completion of the first sub-back-off procedure, determining whether the first transmission bandwidth is available. In these aspects, the means for transmitting the wireless message is further configured to transmit the wireless message at the first transmission bandwidth if it is available. In these aspects, the means for performing a first back-off procedure is further configured to: if the first transmission bandwidth is not available, perform a second sub-back-off procedure based on a second transmission bandwidth lower than the first transmission bandwidth; and in response to completion of the second sub-back-off procedure, determining whether the second transmission bandwidth is available, wherein the means for transmitting the wireless message is configured to transmit the wireless message at the second transmission bandwidth if it is available.

In some aspects of the apparatus, the means for performing a first back-off procedure is further configured to: perform a first sub-back-off procedure based on a first transmission bandwidth and based on a first power level; in response to a completion of the first sub-back-off procedure, determining if a second transmission bandwidth wider than the first transmission bandwidth is available based on a second transmission power level higher than the first transmission power level, wherein the means for transmitting the wireless message is configured to transmit the wireless message at the second transmission bandwidth at a third power level below the second power level and above the first power level if the second transmission bandwidth is available, and wherein the means for transmitting the wireless message is configured to transmit the wireless message at the first transmission bandwidth and the first transmission power level if the second transmission bandwidth is not available.

In some of these aspects, the means for transmitting is configured to determine the third power level is less than or equal to the first transmission bandwidth (dB)+(10*log10 (x1/x2) Db) where: x1=the first transmission bandwidth x2=the second transmission bandwidth Another aspect disclosed is a computer readable storage medium including instructions that when executed cause a processor to perform a method of clear channel assessment on a wireless network. The method includes performing a first back-off procedure based on a transmit power level, and transmitting the wireless message at the transmit power level in response to a completion of the first back-off procedure. In some aspects of the method, the first back-off procedure includes determining a first energy threshold based on the transmit power, and determining whether a transmission channel is available based at least in part on the first energy threshold. In some of these aspects of the method, the first back-off procedure further includes determining whether a packet is detected on the transmission channel, and determining whether the transmission channel is available based at least in part on whether a Wi-Fi packet is detected.

Some aspects of the method further include determining a transmission bandwidth for the wireless message, and determining the transmit power based on the transmission bandwidth. In some aspects of the method, the first back-off procedure is based on the transmission bandwidth, and the method further includes in response to completion of the first back-off procedure, determining an availability of a second transmission bandwidth, wherein the wireless message is transmitted at the second transmission bandwidth if the wireless medium is available, and performing a second back-off procedure if the wireless medium is not available.

In some aspects of the method, the first back-off procedure includes performing at least two sub-back-off procedures in parallel, each sub-back-off procedure based on a different transmission bandwidth, in response to a first sub-back-off procedure of the at least two sub-back-off procedures reaching a first completion threshold, determining whether a first transmission bandwidth corresponding to the first sub-back-off procedure is available during a time period, and wherein the wireless message is transmitted over the first transmission bandwidth if it is available during the time period.

In some of these aspects of the method, the first back-off procedure further includes that, in response to a second of the at least two sub-back-off procedures reaching a second completion threshold, determining whether a second transmission bandwidth corresponding to the second sub-back-off procedure is available during a time period, and wherein the wireless message is transmitted over the second transmission bandwidth if it is available during the time period. In some aspects, the time period is a PIFS time period.

In some aspects of the method, performing a first back-off procedure includes performing a back-off procedure based on a first transmission bandwidth, in response to completion of the back-off procedure, determining if the first transmission bandwidth is available, wherein the wireless message is transmitted at the first transmission bandwidth with a first power level if the first transmission bandwidth is available, and wherein the wireless message is transmitted at a transmission bandwidth lower than the first transmission bandwidth, and at a power level lower than the first power level if the first transmission bandwidth is not available.

In some aspects of the method, performing a first back-off procedure includes performing a first sub-back-off based on a first transmission bandwidth, and after completion of the first sub-back-off procedure, performing a second sub-back off procedure based on a second transmission bandwidth wider than the first bandwidth, wherein the wireless message is transmitted at the second transmission bandwidth in response to completion of the second sub-back-off procedure.

In some of these aspects, the first sub-back-off procedure is based on a measurement of energy over the first transmission bandwidth relative to the first energy detection threshold.

In some aspects of the method, performing a first back-off procedure includes performing a first sub-back-off procedure based on a first transmission bandwidth, in response to completion of the first sub-back-off procedure, determining whether the first transmission bandwidth is available, wherein the wireless message is transmitted at the first transmission bandwidth if it is available, if the first transmission bandwidth is not available, performing a second sub-back-off procedure based on a second transmission bandwidth lower than the first transmission bandwidth, and in response to completion of the second sub-back-off procedure, determining whether the second transmission bandwidth is available, wherein the wireless message is transmitted at the second transmission bandwidth if it is available.

In some aspects of the method, performing a first back-off procedure includes performing a first sub-back-off procedure based on a first transmission bandwidth and based on a first power level, and then in response to a completion of the first sub-back-off procedure, determining if a second transmission bandwidth wider than the first transmission bandwidth is available based on a second transmission power level higher than the first transmission power level, wherein the wireless message is transmitted at the second transmission bandwidth at a third power level below the second power level and above the first power level if the second transmission bandwidth is available, and wherein the wireless message is transmitted at the first transmission bandwidth and the first transmission power level if the second transmission bandwidth is not available.

In some of these aspects, the third power level is less than or equal to the first transmission bandwidth (dB)+(10*log10 (x1/x2) Db) where: x1=the first transmission bandwidth and x2=the second transmission bandwidth.

Another aspect disclosed is a method of clear channel assessment on a wireless network. The method includes determining a clear channel assessment (CCA) threshold based on a first transmission bandwidth, performing a first back-off procedure based on the determined clear channel assessment threshold; and transmitting a first wireless message over the first transmission bandwidth in response to a completion of the first back-off procedure. In some aspects, the method includes determining a packet detection energy threshold based on a first transmission bandwidth. Performing the first back-off procedure includes detecting whether a packet is being transmitted on the wireless network based on the packet detection energy threshold, and determining whether the first transmission bandwidth is idle based on whether a packet is detected.

In some aspects, the method also includes determining a first energy threshold based on the first transmission bandwidth. In these aspects, performing the first back-off procedure includes determining whether a received wireless network energy level at the first transmission bandwidth is below the first energy threshold, and determining whether the first transmission bandwidth is idle based on whether the energy level is below the first energy threshold.

In some aspects, the first back-off procedure comprises performing at least two sub-back-off procedures at least partially in parallel, each sub-back-off procedure based on a different corresponding transmission bandwidth. In some of these aspects, the method also includes completing a first of the at least two sub-back off procedures; and transmitting the first wireless message over a transmission bandwidth corresponding to the first sub-back-off procedure in response to a completion of the first sub-back-off procedure.

In some aspects of the method, performing the first back-off procedure includes determining whether the first transmission bandwidth is available in response to completion of the first back-off procedure. In these aspects, the first wireless message is transmitted at the first transmission bandwidth if it is available. If the first transmission bandwidth is not available, performing a second back-off procedure based on a second transmission bandwidth lower than the first transmission bandwidth; and in response to completion of the second back-off procedure, determining whether the second transmission bandwidth is available, wherein the first wireless message is transmitted at the second transmission bandwidth if it is available.

Another aspect disclosed is an apparatus for clear channel assessment on a wireless network. The apparatus includes a processor configured to determine a clear channel assessment (CCA) threshold based on a first transmission bandwidth, and perform a first back-off procedure based on the determined clear channel assessment threshold; and a transmitter configured to transmit a first wireless message over the first transmission bandwidth in response to a completion of the first back-off procedure.

In some aspects of the apparatus, the processor is further configured to determine a packet detection energy threshold based on a first transmission bandwidth. In these aspects, the processor is configured to perform the first back-off procedure by: detecting whether a packet is being transmitted on the wireless network based on the packet detection energy threshold, and determining the first transmission bandwidth is idle if a packet is not detected.

In some aspects, of the apparatus, the processor is further configured to determine a first energy threshold based on the first transmission bandwidth, wherein the processor is further configured to perform the first back-off procedure by: determining whether a received wireless network energy level at the first transmission bandwidth is below the first energy threshold, and determining the first transmission bandwidth is idle if the energy level is below the first energy threshold.

In some aspects of the apparatus, the processor is configured to perform the first back-off procedure by performing at least two sub-back-off procedures at least partially in parallel, each sub-back-off procedure based on a different corresponding transmission bandwidth.

In some aspects of the apparatus, the processor is further configured to complete a first of the at least two sub-back off procedures; and transmit the first wireless message over a transmission bandwidth corresponding to the first sub-back-off procedure in response to a completion of the first sub-back-off procedure. In some aspects of the apparatus, the processor is configured to perform the first back-off procedure by determining whether the first transmission bandwidth is available in response to completion of the first back-off procedure, transmitting the first wireless message at the first transmission bandwidth if it is determined to be available. If the first transmission bandwidth is not available, performing a second back-off procedure based on a second transmission bandwidth lower than the first transmission bandwidth, determining whether the second transmission bandwidth is available in response to completion of the second back-off procedure, and transmitting the first wireless message at the second transmission bandwidth if it is determined to be available.

Another aspect disclosed is an apparatus for clear channel assessment on a wireless network. The apparatus includes means for determining a clear channel assessment (CCA) threshold based on a first transmission bandwidth, means for performing a first back-off procedure based on the determined clear channel assessment threshold, and means for transmitting a first wireless message over the first transmission bandwidth in response to a completion of the first back-off procedure.

In some aspects of the apparatus, the apparatus includes means for determining a packet detection energy threshold based on a first transmission bandwidth. In these aspects, the means for performing the first back-off procedure is configured to detect whether a packet is being transmitted on the wireless network based on the packet detection energy threshold, and determine the first transmission bandwidth is idle if a packet is not detected.

Some aspects of the apparatus also include means for determining a first energy threshold based on the first transmission bandwidth. In these aspects, the means for performing the first back-off procedure is configured to determine whether a received wireless network energy level at the first transmission bandwidth is below the first energy threshold; and determine the first transmission bandwidth is idle if the energy level is below the first energy threshold.

In some aspects of the apparatus, the means for performing the first back-off procedure is configured to perform at least two sub-back-off procedures at least partially in parallel, each sub-back-off procedure based on a different corresponding transmission bandwidth.

Another aspect disclosed is a computer readable storage medium comprising instructions that when executed cause a processor to perform a method of clear channel assessment on a wireless network. The method includes determining a clear channel assessment (CCA) threshold based on a first transmission bandwidth, performing a first back-off procedure based on the determined clear channel assessment threshold; and transmitting a first wireless message over the first transmission bandwidth in response to a completion of the first back-off procedure.

In some aspects, the method also includes determining a packet detection energy threshold based on a first transmission bandwidth. In these aspects, performing the first back-off procedure includes detecting whether a packet is being transmitted on the wireless network based on the packet detection energy threshold; and determining the first transmission bandwidth is idle if a packet is not detected.

In some aspects of the computer readable medium, the method further comprises determining a first energy threshold based on the first transmission bandwidth. In these aspects, performing the first back-off procedure includes determining whether a received wireless network energy level at the first transmission bandwidth is below the first energy threshold; and determining the first transmission bandwidth is idle if the energy level is below the first energy threshold. In some aspects, the method also includes performing at least two sub-back-off procedures at least partially in parallel, each sub-back-off procedure based on a different corresponding transmission bandwidth.

DETAILED DESCRIPTION

Figure 1:
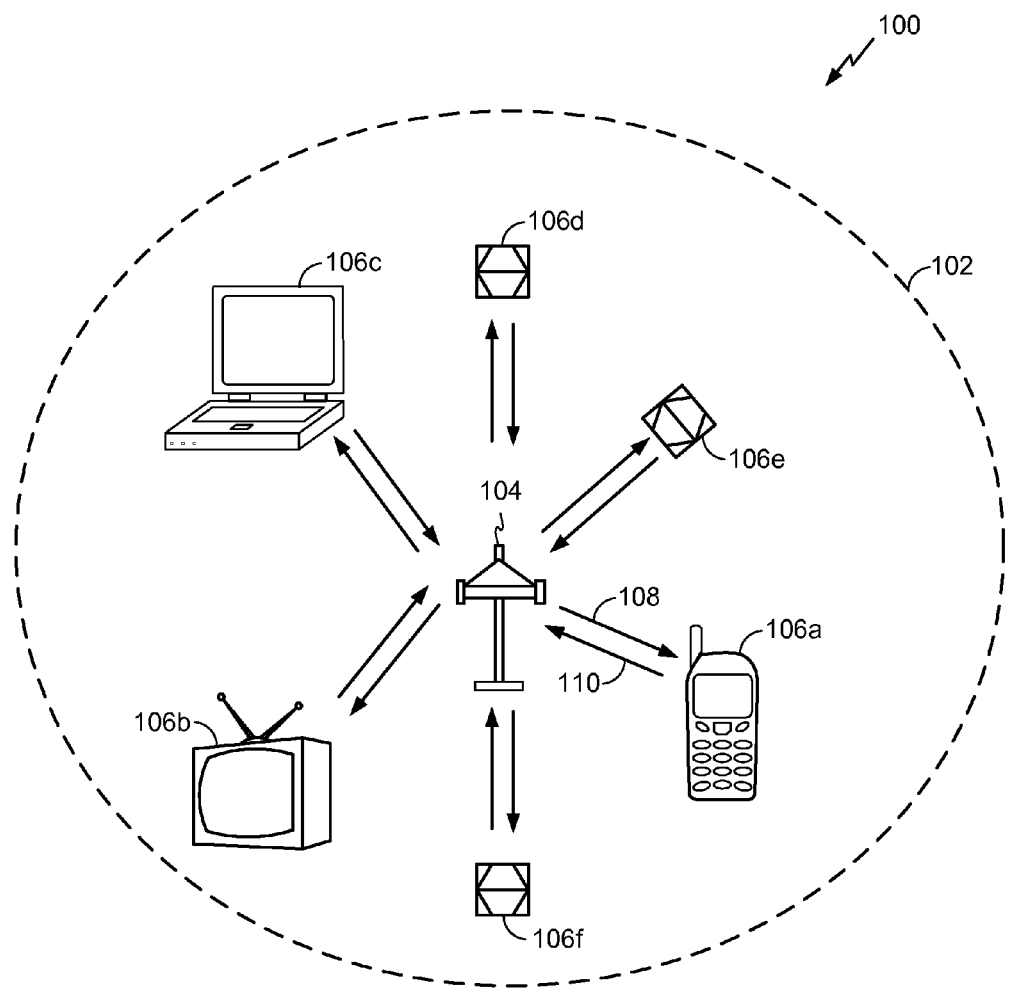
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized backoff period i.e. an additional period of time in which the node wishing to transmit will not attempt to access the medium. The backoff period is used to resolve contention between different nodes trying to access a medium at the same time. The backoff period may also be referred to as a contention window. Backoff requires that each node attempting to access a medium choose a random number within a predefined range. Each node then waits for the random number of time slots before attempting to access the medium again. The node will then determine whether another node has accessed the medium during its waiting period.

The slot time is defined in such a way that a node will always be capable of determining if another node has accessed the medium at the beginning of the previous slot. In particular, the 802.11 standard uses an exponential back off algorithm. With the 802.11 approach, each time a node selects a slot and senses that another node has transmitted; it will increase the maximum number of the random range discussed above exponentially. If, on the other hand, a node wishing to transmit senses the medium as free for a specified time (called the Distributed Inter Frame Space (DIFS) in the 802.11 standard), then the node is allowed to transmit on the medium.

After a transmission occurs, a receiving node may perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d-f (e.g. a weather sensor or other sensor capable of communicating using a wireless protocol), to name a few.

Figure 2:
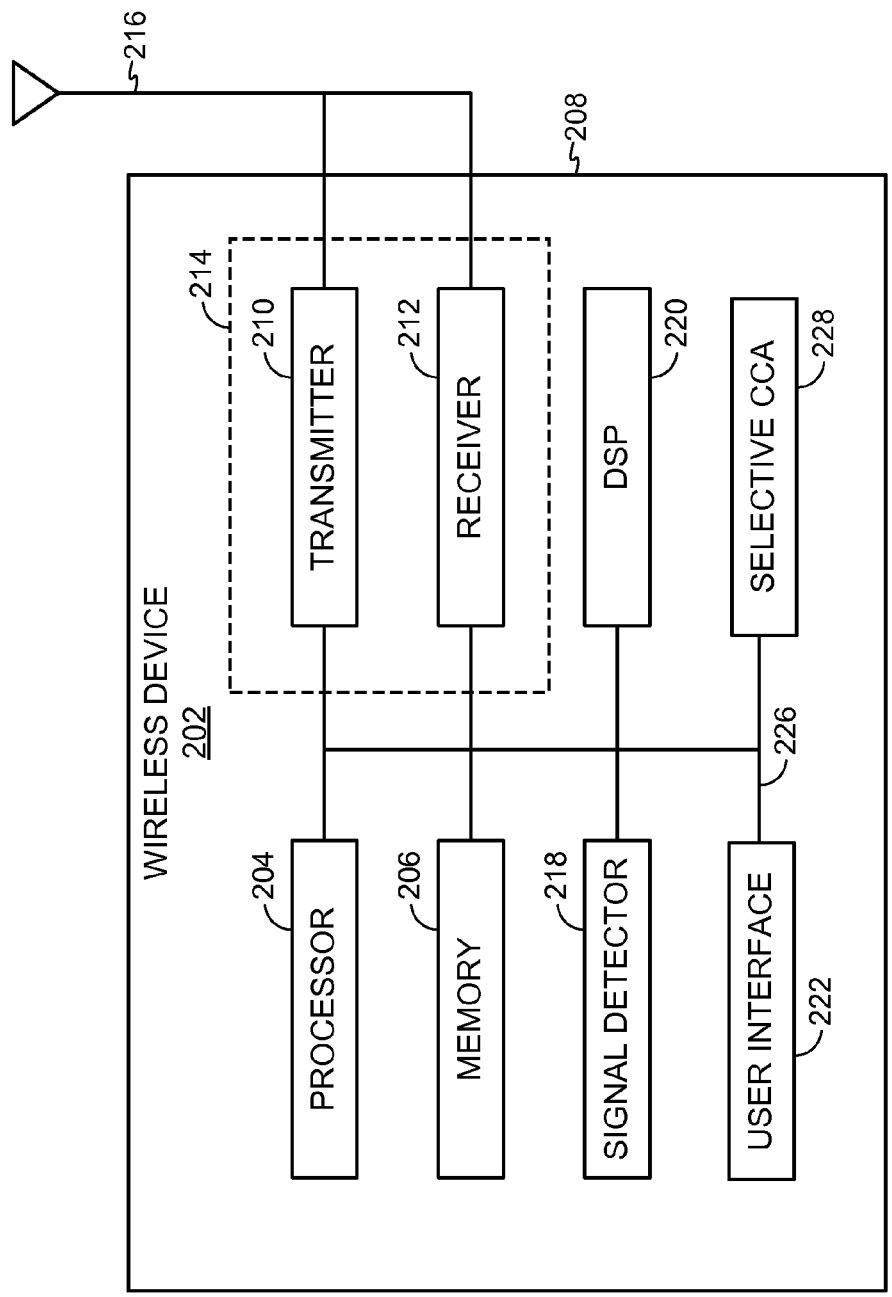
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a selective clear channel assessment (CCA) module 228. The selective CCA module may include any element or component that performs a clear channel assessment for the wireless device 202 based on one or more parameters. The parameters may include a transmission power, transmission bandwidth, a packet detection threshold, and/or energy detection threshold.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In certain wireless communications such as those specified in the IEEE 802.11ah protocol, a sub-gigahertz band may be used. This band may have a longer range than other higher bands, at the same transmission power. For example, these bands may have approximately twice the range of 2.4 GHz or 5 GHz bands, as used in IEEE 802.11n. This longer range may enable devices to communicate from a greater distance. However, in a busy area, this longer range may also mean that any individual device will hear transmissions from a large number of other devices. This may cause issues with the device having to defer to those other transmissions, and not being able to access the medium. For example, a device may check the medium prior to transmitting, and may be much more likely to find that the medium is busy if the device has a significantly longer range. One possible solution to this problem is to raise the CCA thresholds used by the device. This may make a device less sensitive to distant devices, and thus, defer to other devices less often. However, one issue with raising CCA thresholds is that low bandwidth devices and low power devices may not receive complete protection for their transmissions, as their transmissions may not be of sufficient energy level to exceed the raised CCA thresholds. For example, some sensors may use low power transmitters in order to minimize power usage. These sensors may be an important use case for IEEE 802.11 ah. These sensors may use 1 or 2 MHz bandwidth and have no power amplifier (PA). These devices may not receive complete protection for their transmissions when raised CCA thresholds are in use.

Figure 3:
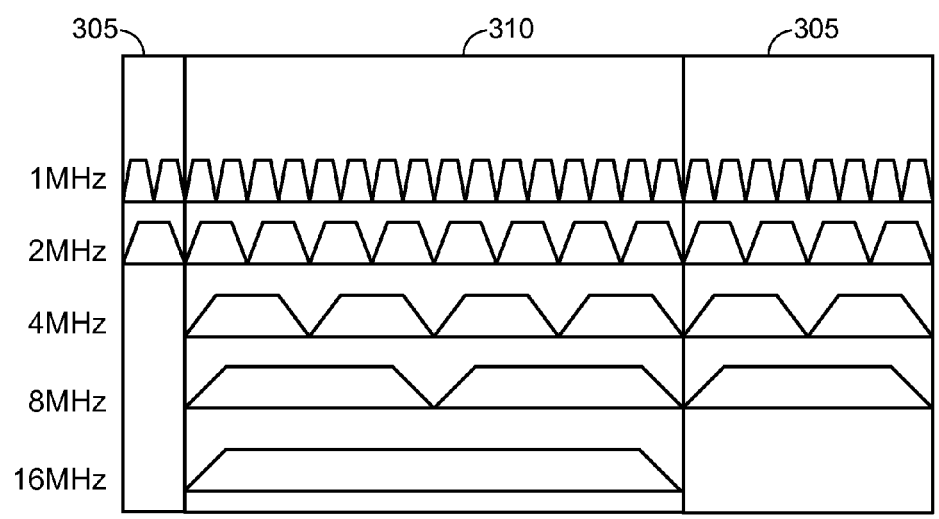
FIG. 3 illustrates an example of a division of channels into two or more types with different CCA thresholds.

In order to provide for these low power and/or low bandwidth transmissions while still obtaining the benefits of increased CCA thresholds, the spectrum may be split into two or more types of channels, with different CCA thresholds associated with each of the two or more types of channels. For example, FIG. 3 is an illustration of one example method of splitting the IEEE 802.11ah spectrum into two types of channels, with different CCA thresholds associated with the two types of channels. In FIG. 3, the 26 MHz of spectrum that is used for IEEE 802.11ah has been divided into two types, the Type 1 Spectrum 305 and the Type 2 Spectrum 310.

The channels in the Type 2 Spectrum 310 may have higher CCA thresholds than the channels in the Type 1 Spectrum 305. For example, the channels in the Type 2 Spectrum 310 may have CCA thresholds that are 1 dB, 4 dB, 10 dB, 12 dB, 15 DB, or some other amount higher than those in the Type 1 Spectrum 305. Use of a higher CCA threshold may increase the frequency with which devices wishing to use this portion of the spectrum are able to use these frequencies, as it may reduce the proportion of the time that such a device would determine that the spectrum is already in use.

Similarly, other channels may be provided which have lower CCA thresholds. These channels may benefit low power and/or low bandwidth devices, which may receive more complete protection for their transmissions in the lower CCA threshold channels, as the lower CCA thresholds on these channels may mean that more devices in a wider area will defer to the transmissions of these low-power devices than would defer in a higher CCA threshold channel. In some aspects, higher bandwidth devices may be configured to prefer the high CCA threshold channels. For example, higher bandwidth devices may select the higher CCA channels for transmissions by default. Lower bandwidth devices may utilize the lower CCA threshold channels by default.

The division of the channels in FIG. 3 is merely an example of a way to divide a spectrum. This division may also be done in other portions of the spectrum, and may be done in other manners. For example, more than two channels may be used. The division shown in FIG. 3 may be beneficial for certain portions of the spectrum, as it may allow the single 16 MHz channel contained within this portion of the spectrum to use the higher CCA thresholds. This may be beneficial, as it may allow higher bandwidth devices, such as cellular telephones, to use the 16 MHz channel more often, as the higher CCA thresholds in the Type 2 Spectrum 310 channels may allow these devices to more frequently access this channel with fewer times when the channel is found to be in use. While the division of the channels in FIG. 3 provides that no individual channel, such as the single 16 MHz channel, contains both Type 1 and Type 2 portions, other divisions may be used where single channels may contain parts which are higher CCA and parts which are lower CCA threshold channels. For example, CCA thresholds may be set that the first 1 MHz of a 2 MHz channel is a Type 2 channel, with higher CCA thresholds, and the second 2 MHz of a 2 MHz channel is a Type 1 channel, with lower CCA thresholds.

In some aspects, the CCA threshold levels for higher CCA threshold channels, such as Type 2 channels, may be derived from the CCA threshold levels of Type 1 channels. For example, the CCA threshold levels of Type 2 channels may be the CCA threshold levels of Type 1 channels, plus some protection factor. In some aspects, the protection factor may be expressed in decibels. This protection factor may be, for example, 1 dB, 4 dB, 10 dB, 12 dB, 15 dB, or some other dB level. In some aspects, the protection factor may be between 1 dB and 15 dB. This protection factor may be applied to each of the CCA thresholds for a channel.

For example, a channel may have three different CCA thresholds. A channel may have a higher CCA threshold for energy detection, a lower CCA threshold level for guard interval (GI) detection, and a lower-still CCA threshold level of signal detection. In some aspects, each of these CCA threshold levels of a Type 1 channel may be increased by a protection factor in a Type 2 channel. In some aspects, the protection factor for each level may be the same or may be different for each of the CCA thresholds. In some aspects, the protection factor used may differ for different bandwidth channels. For example, 8 MHz channels may use different CCA thresholds and different protection factors than 16 MHz channels.

In some aspects, FIG. 3 may represent a possible channelization for IEEE 801.11ah networks in some regions, such as in the United States. This channelization may be beneficial because there are no channels which straddles different CCA level regions. Another benefit of this channelization may be that there is a 16 MHz Type 2 channel provided, for high data-rate devices. It may also be beneficial that the two Type 1 channel areas are separated in frequency, which may help sensors avoid interference. In some aspects, other channelizations may be used. For example, other channelizations may be used in other regions.

Figure 4B:
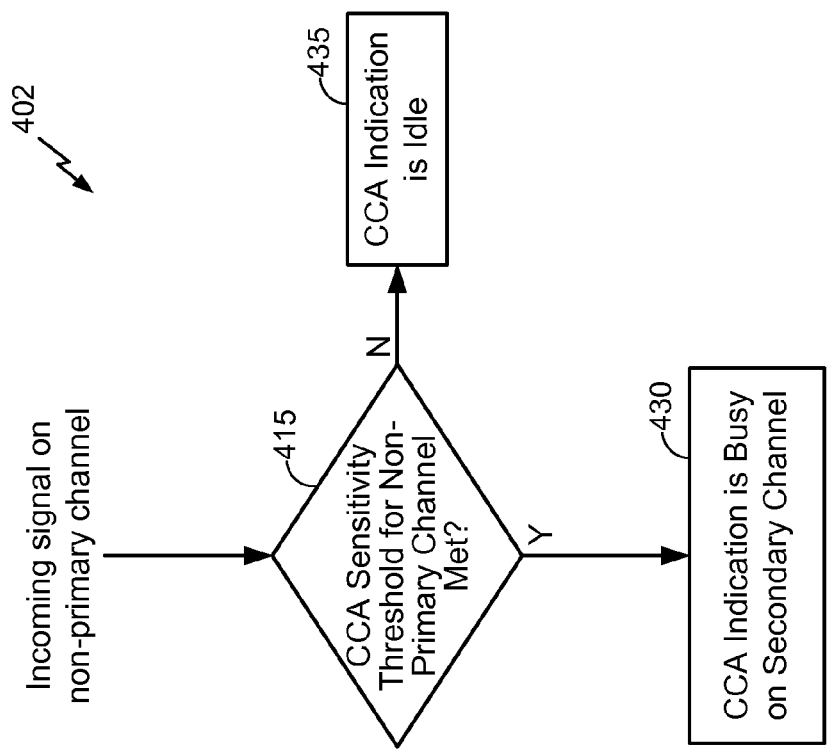
FIG. 4B is a flowchart illustrating how clear channel assessment is performed in one implementation of an 802.11ah wireless network.
Figure 4A:
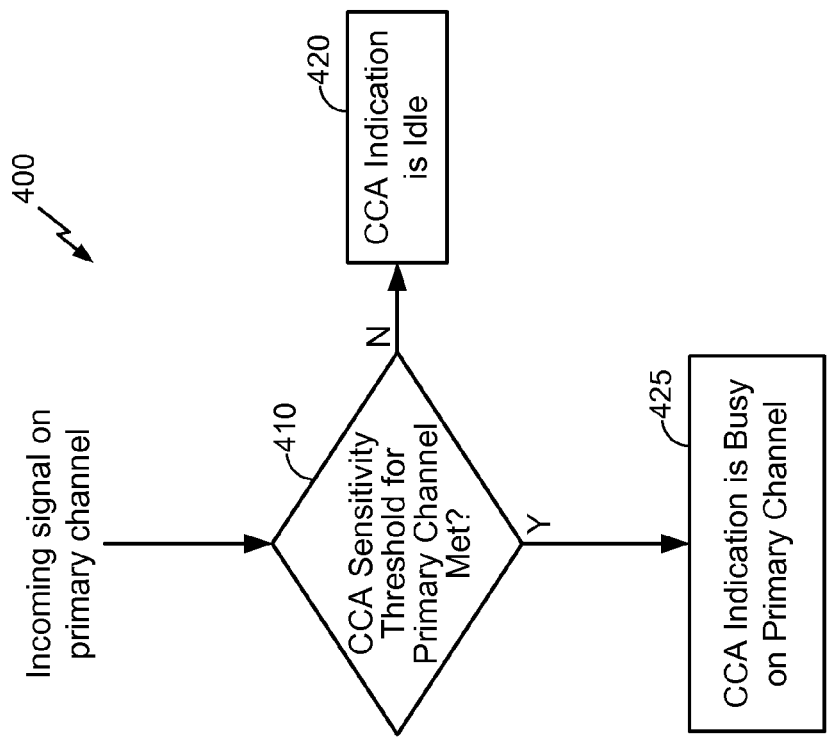
FIG. 4A is a flowchart illustrating how clear channel assessment is performed in one implementation of an 802.11ah wireless network.

FIG. 4A is a flowchart illustrating how clear channel assessment is performed in one implementation of an 802.11ah wireless network. Process 400 may be performed, in some aspects, by the wireless device 202. For example, one or more of the processor 204 and receiver 212 may perform functions of process 400.

Process 400 begins with an incoming signal received on a primary channel. In some aspects, the primary channel may be a channel that has a bandwidth of 20 Mhz. Block 410 determines whether a clear channel assessment sensitivity threshold for the primary channel is met. If the threshold is met, the channel state for the primary channel is set to busy in block 425. If the threshold is not met, the CCA indication is set to idle in block 420.

FIG. 4B is a flowchart illustrating how clear channel assessment is performed in one implementation of an 802.11ah wireless network. Process 402 may be performed, in some aspects, by the wireless device 202. For example, one or more of the processor 204 and receiver 212 may perform functions of process 402.

Process 402 begins with an incoming signal received on a non-primary 20 Mhz channel. The non-primary channel referenced in process 402 may be of course different than the primary channel referenced in process 400. Decision block 415 evaluates whether a clear channel assessment (CCA) sensitivity threshold for the non-primary channel is met. If the threshold is met, the CCA indication for the secondary channel is set to busy in block 430. If the threshold for the non-primary channel is not met, the CCA indication is set to idle in block 435. In some implementations, process 400 and process 402 may be used together. For example, some implementations may first determine whether an incoming signal is using the primary 20 Mhz channel or a non-primary 20 MHz channel. These implementations may then utilize process 400 for the primary 20 Mhz channel receptions and process 402 for the non-primary 20 Mhz receptions.

Figure 5:
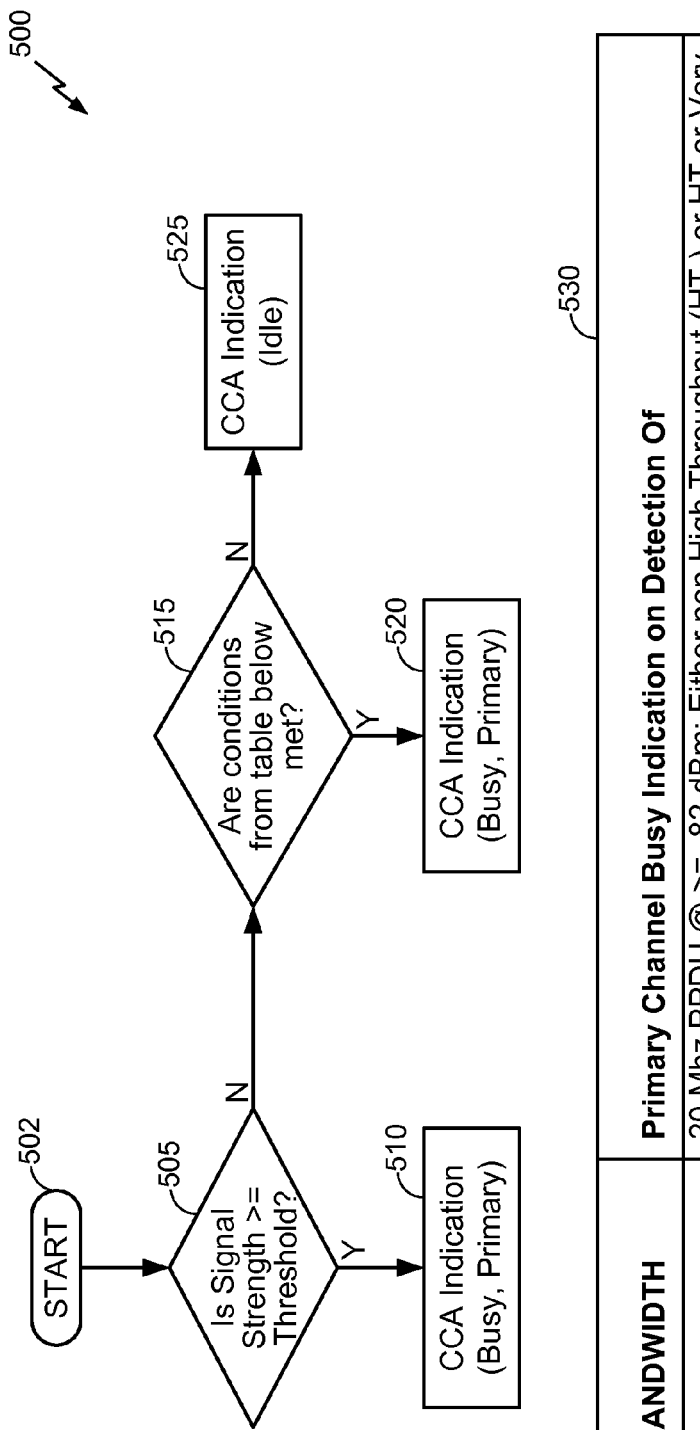
FIG. 5 is a flowchart illustrating one implementation of clear channel assessment of a primary channel.

FIG. 5 is a flowchart illustrating one example implementation of clear channel assessment of a primary channel. In one aspect, the primary channel illustrated may be a 20 Mhz channel. In some aspects, the wireless device 202 may perform process 500. For example, process 500 may be performed in some aspects by one or more of the processor 204 and/or receiver 212. In some aspects, process 500 below may be performed by block 410 of process 400.

Process 500 starts at start block 502 and then moves to decision block 505. Decision block 505 determines whether the signal strength of the incoming signal is greater than a threshold. In some aspects, the threshold may be −62 dBm. Other aspects of process 500 may use a different signal strength threshold. If the signal is at least as large as the threshold, a clear channel assessment (CCA) indication is set to busy for the primary channel in block 510. If the signal strength is less than the threshold, decision block 515 determines whether the conditions of table 530 are met. If they are met, the CCA indication for the primary channel is set to busy. If the conditions outlined in the table 530 are not met, the CCA indication is set to idle in block 525. Note that the table disclosed in FIG. 5 provides threshold values in decibels for one implementation of 802.11ac. Implementations of 802.11ah, or other implementations all together, may utilize different threshold values than those disclosed without departing from the spirit of the disclosed systems, apparatus, and methods herein.

Figure 6A:
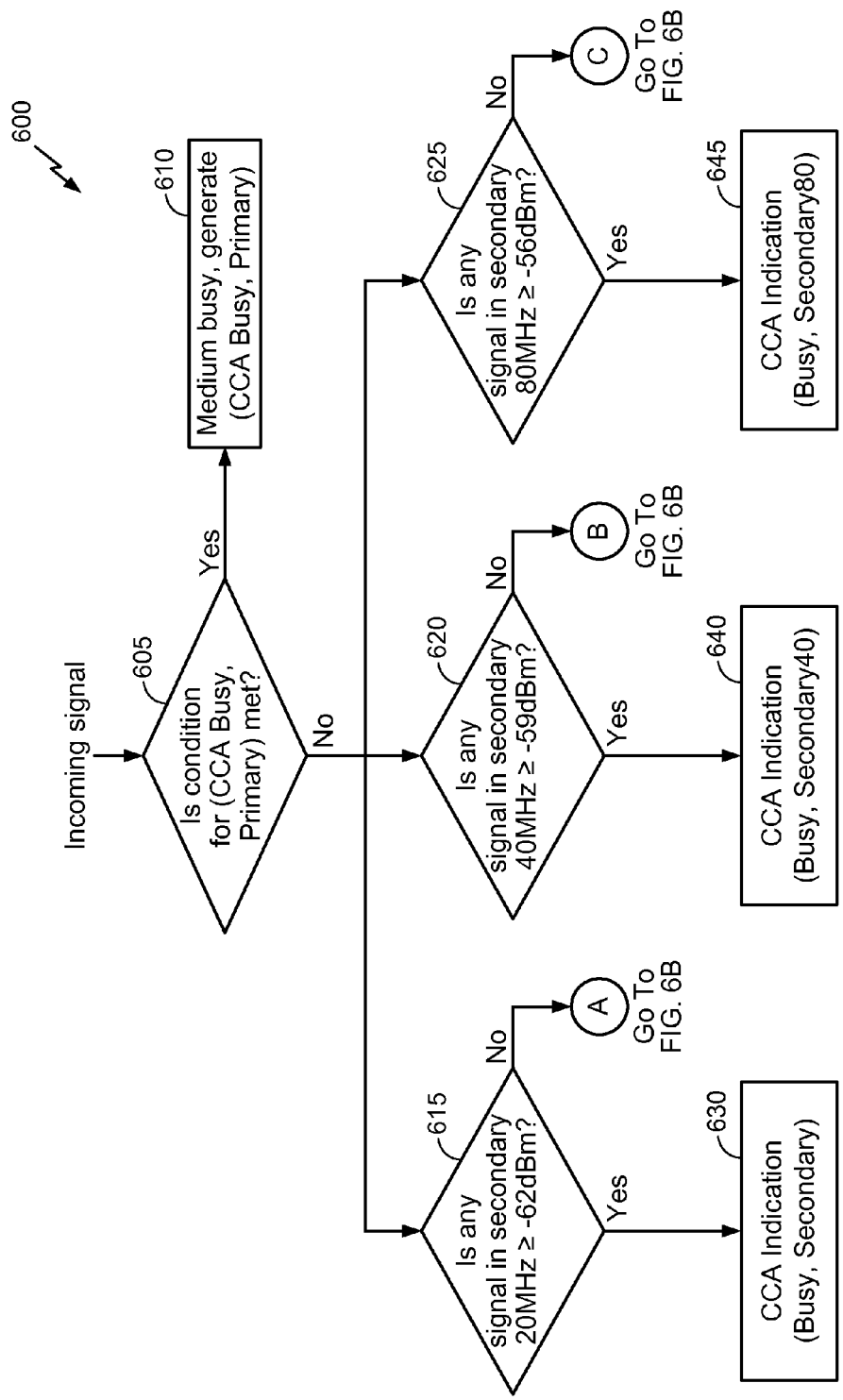
FIG. 6A is a flowchart illustrating one implementation of clear channel assessment of a secondary channel.
Figure 6B:
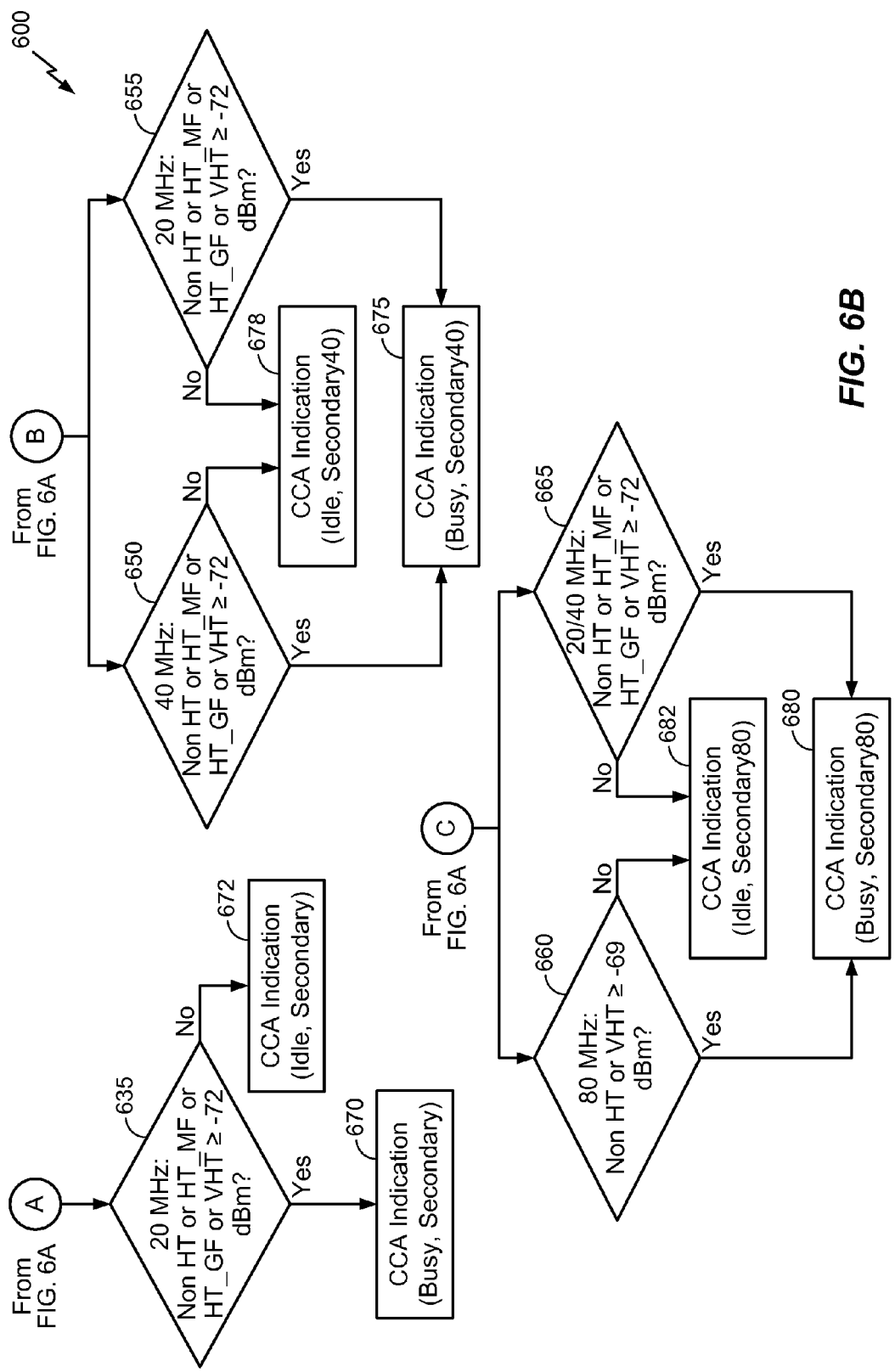
FIG. 6B is a continuation of the flowchart in FIG. 6A, illustrating one implementation of clear channel assessment of a secondary channel.

FIG. 6A is a flowchart illustrating one implementation of a clear channel assessment of a secondary channel. Process 600 utilizes different sensitivity thresholds corresponding to different primary or secondary channels to determine whether a channel is idle or busy. While FIGS. 6A-6B illustrate the use of specific threshold, these are merely exemplary, and various implementations may vary from the specific threshold shown in FIGS. 6A-B.

For example, a 20 Mhz secondary channel may utilize a sensitivity threshold of −62 dBM, or some other threshold. A 40 Mhz secondary channel may utilize a sensitivity threshold of −59 dBm, while an 80 Mhz secondary channel may utilize a sensitivity threshold of −56 dBm. When determining whether one or more of the secondary channels is busy, the energy within a frequency range is compared to the corresponding energy threshold corresponding to that frequency range. In some aspects, process 600 may be performed by the wireless device 202. For example, one or more of the receiver 212 and/or the processor 204 may perform process 600.

Block 605 receives an incoming signal. Block 605 further determines whether the CCA threshold for the primary channel is met by the incoming signal. If the signal is above the CCA threshold, block 610 sets the state of the primary channel to busy. Otherwise, each of blocks 615, 620, and 625 determines the frequency of the incoming signal. In decision block 615, if the signal is in a secondary 20 MHz range, the signal is compared to a first threshold, for example, −62 dBm as shown by block 615.

If the signal is within the secondary 20 Mhz channel and greater than the first threshold, block 630 sets a 20 Mhz secondary channel indication to busy. Otherwise, process 600 moves to off page reference "A" shown in FIG. 6B. In FIG. 6B, reference "A" enters decision block 635. Block 635 in FIG. 6B determines whether the signal is a High Throughput (HT) High Throughput mixed format (HT MF) or a High Throughput greenfield format (HT GF) or a Very High Throughput (VHT) signal. If it is, and the signal is greater than or equal to a second threshold, such as −72 dBm, then the 20 Mhz secondary channel indication is set to busy in block 670. Otherwise, the 20 Mhz secondary channel indication is set to idle in block 672. In some aspects, block 672 may not be performed, for example, if the CCA indications are initialized to idle before process 600 begins.

Returning to FIG. 6A, block 620 determines whether the incoming signal is within a secondary 40 Mhz channel, and the signal is greater than a third threshold, in the illustrated example, −59 dBm. If it is, then a 40 Mhz secondary channel indication is set to busy in block 640. Otherwise, process 600 moves via off-page reference "B" to block 650 and 655 of FIG. 6B. Block 650 determines whether the incoming signal is within the 40 Mhz secondary channel, and is a Non-High Throughput or a High Throughput mixed format (HT MF) or a High Throughput greenfield format (HT GF) or a Very High Throughput signal that is greater than or equal to a fourth threshold, such as −72 dBm. If it is, a secondary 40 Mhz channel indication is set to busy in block 675. Decision block 655 determines whether the incoming signal is within the 20 Mhz secondary channel, and is a Non High Throughput or a High Throughput mixed format or a high throughput greenfield format, or a Very High Throughput signal that is greater than a fifth threshold, such as in the illustrated embodiment, −72 dBm. If it is, then the secondary 40 Mhz channel indication is set to busy in block 675. If neither of the conditions determined in blocks 650 or 655 are met, then the secondary 40 Mhz channel indication is set to idle in some aspects in block 678. For reasons discussed previously, in some aspects, block 678 is not performed.

Returning to FIG. 6A, if block 625 determines that the incoming signal is within a secondary 80 Mhz channel, and the signal is greater than or equal to a sixth threshold, in the illustrated example, −56 dBm, then a 80 Mhz secondary channel indication is set to busy in block 645. Otherwise, two conditions are checked in blocks 660 and 665 of FIG. 6B via off page reference "C."

Block 660 determines whether the incoming signal includes an 80 Mhz Non High Throughput or a Very High Throughput signal above a seventh threshold, in the illustrated aspect, −69 Mhz. If it does, a secondary 80 Mhz channel indication is set to busy in block 680. Block 665 determines whether either a 20 or 40 Mhz signal is present in the incoming signal in a high throughput, high throughput mixed format, or high throughput greenfield format, or a very high throughput format, and if the signal is above a eighth threshold, in the illustrated example, −72 dBm. If it is, then the 80 Mhz secondary channel indication is set to busy in block 680. If neither of the conditions evaluated in blocks 660 or 665 are true, then in some aspects of process 600, the secondary 80 Mhz channel indication is set to idle in block 682. For reasons discussed previously, in some aspects, block 682 is not performed.

Process 600 may be utilized by some implementations to determine whether one or more of a primary 20 Mhz channel, 20 Mhz secondary channel, 40 Mhz secondary channel, and/or 80 Mhz secondary channel is idle or busy. These implementations may condition transmission of one or more messages over these channels on the indications. For example, in some aspects, if a primary channel is idle, an implementation may determine whether one or more secondary channels are idle. Transmission of a message may then be based on these determinations. For example, a message may be transmitted on the highest secondary channel bandwidth that is available. Some details of these implementations are further discussed below.

Note that the FIG. 6 discloses example threshold values for one implementation of 802.11ac. Implementations of 802.11ah, or other non-802.11 implementations, may utilize different threshold values than those disclosed without departing from the spirit of the disclosed systems, apparatus, and methods herein.

Figure 7A:
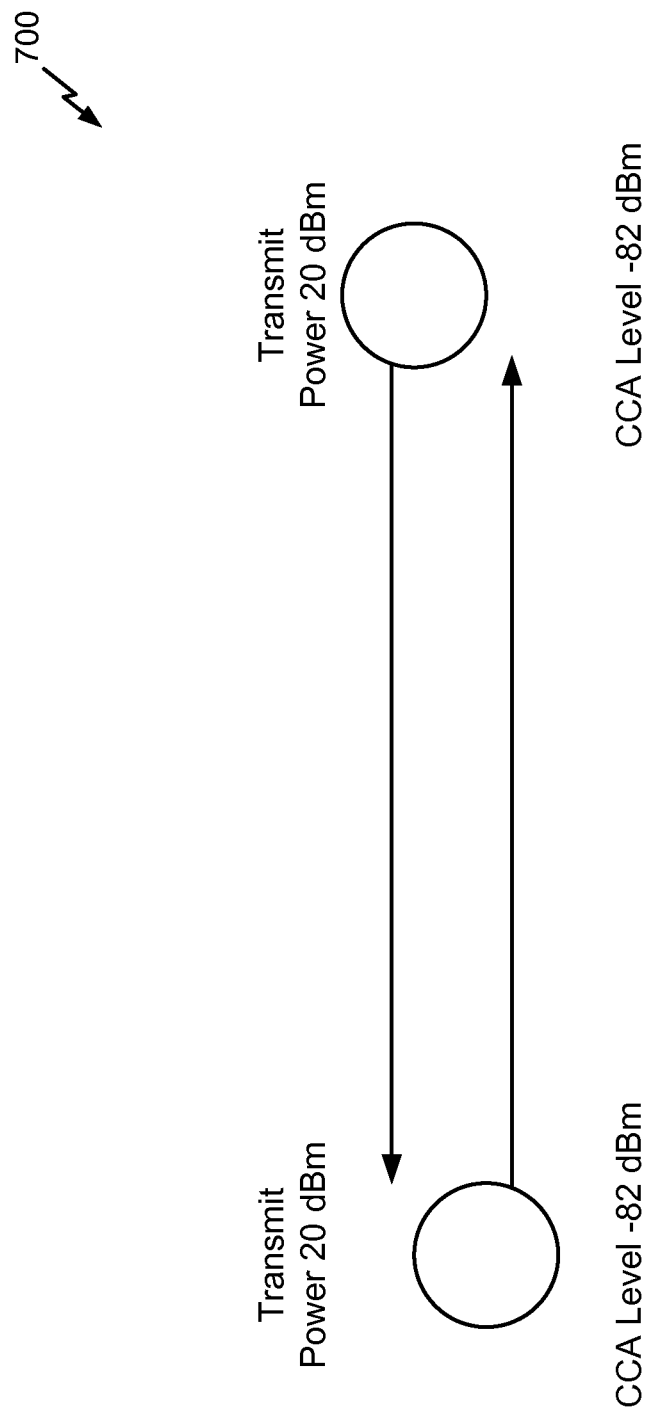
FIG. 7A illustrates clear channel assessment deferral between two wireless devices with equal transmission power.

FIG. 7A illustrates clear channel assessment deferral between two wireless devices with equal transmission power. One purpose of clear channel assessment (CCA) is to prevent a device from initiating a transmission while another device is transmitting. This protects other devices from potential collisions between a transmission already in progress and the initiated transmission. This also protects the transmitting device itself, as any transmission on the wireless medium may be destined for the device itself.

Many wireless standards define CCA thresholds that devices conforming to the standard should apply. These standards operate under the assumption that transmission power is the same for all devices utilizing a particular channel. For example, the standards assume a 20 MHz only network is utilized only by devices using the same transmit power, and therefore assume contention between the devices is resolved fairly. Such a fair contention scheme is illustrated in FIG. 7A. As shown in FIG. 7A, both device 1 and device 2 are transmitting with an example power level of 20 dBM. Each device is utilizing an example clear channel assessment threshold of −82 dBm. Therefore, each device may or may not defer depending on whether the transmitted power of a second device is above the CCA level at the first device.

Figure 7B:
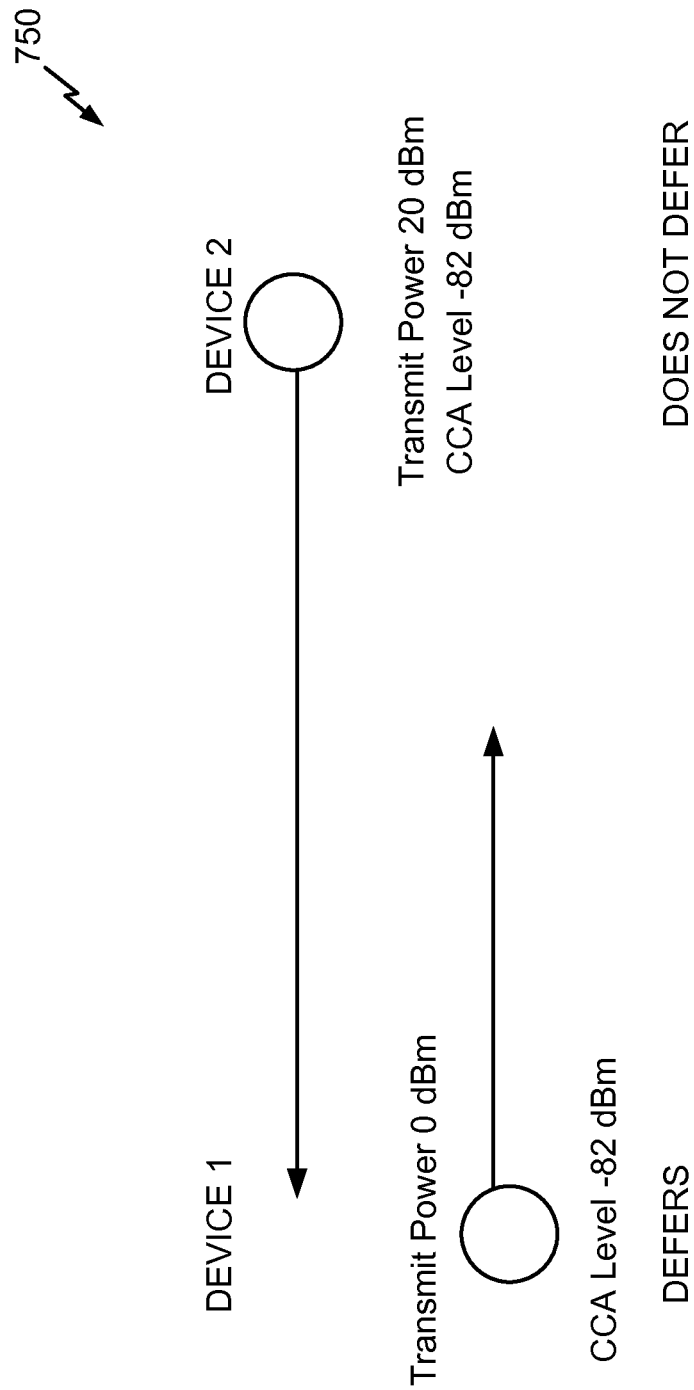
FIG. 7B illustrates clear channel assessment deferral between two wireless devices utilizing a different transmission power.

FIG. 7B illustrates clear channel assessment deferral between two wireless devices utilizing two different transmission powers. Device 1 is transmitting with an example transmission power of 0 dBm, while device 2 is transmitting with an example transmission power of 20 dBm. Because the strength of device 1's signal when received at device 2 is below the CCA threshold utilized by device 2, device 2 does not defer when device 1 is transmitting. Device 2's transmissions, because they are transmitted at a higher transmission power, are above the example CCA threshold of −82 dBm utilized by device 1. Therefore, device 1 does defer to device 2. Because device 1 defers more readily to device 2 than device 2 defers to device 1, the clear channel assessment procedure illustrated in FIG. 7B may be considered unfair to device 1.

Figure 7C:
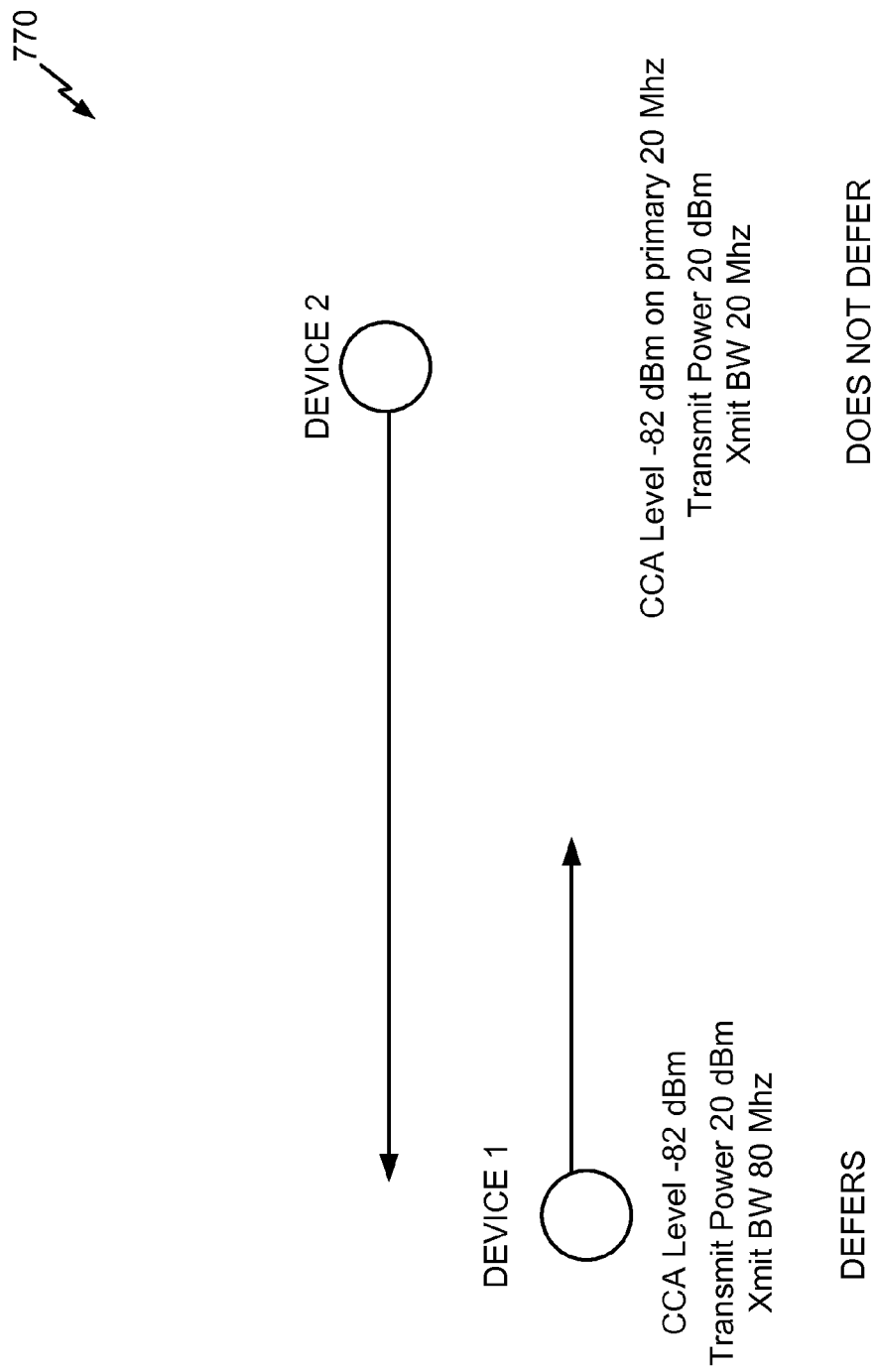
FIG. 7C illustrates clear channel assessment deferral between two wireless devices utilizing a different transmission bandwidth.

FIG. 7C illustrates clear channel assessment deferral between two wireless devices utilizing different transmission bandwidths. As shown, device 1 is transmitting with an example transmit power of 20 dBm across an 80 Mhz bandwidth. Device 2 is transmitting with an example transmit power of 20 dBm, but across a smaller 20 Mhz bandwidth. Because the example 20 dBm transmit power of device 2 is "concentrated" within the 20 Mhz of bandwidth, whereas device 1's 20 dBm transmit power is "dispersed" across an 80 Mhz bandwidth, transmissions by device 1 may be below device 2's CCA threshold of −82 dBm. However, because device 2's 20 dBm transmit power is "concentrated" as described above, transmissions by device 2 may be received by device 1 at a level above its CCA threshold of −82 dBm. Therefore, in some aspects, device 1 may defer more readily to device 2 transmissions than device 2 defers to device 1 transmissions. Therefore, the CCA deferral procedure illustrated in FIG. 7C may be considered unfair.

Figure 8A:
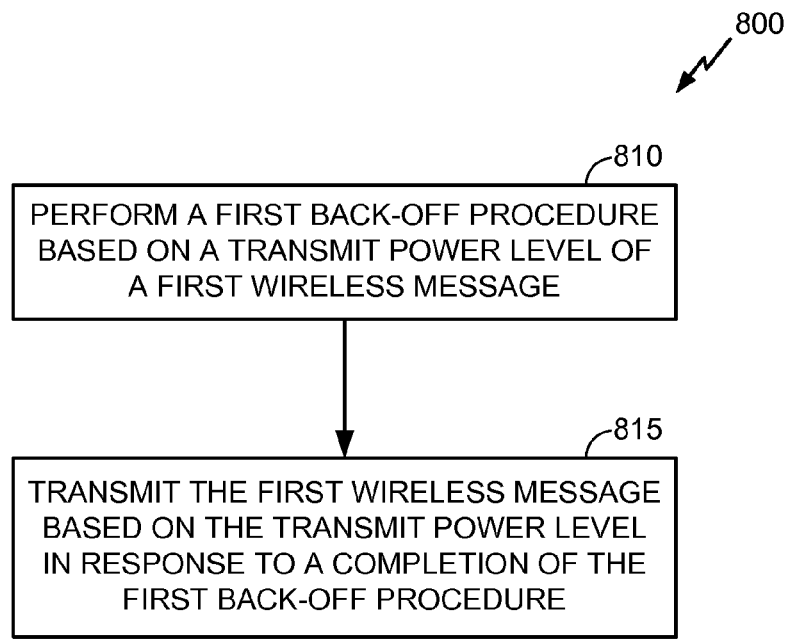
FIG. 8A is a flowchart of a process for transmit power based clear channel assessment on a wireless network.

FIG. 8A is a flowchart of a process for transmit power based clear channel assessment on a wireless network. In some aspects, process 800 may be performed by the device 202 illustrated in FIG. 2. FIG. 8 describes a process that may result in a more fair deferral procedure between devices of unequal transmit power. For example, FIG. 8 and process 800 describe use of a back-off procedure that is based on a transmit power level. In some aspects, devices with stronger transmit power may defer for longer periods of time than devices with lower transmit power levels.

In block 810, a first back-off procedure is performed based on a transmission power of a first wireless message. In some aspects, a wireless communication standard utilizing the disclosed methods and systems may define one or more reference transmission powers and corresponding reference energy detection thresholds for a planned transmission bandwidth(s). The wireless communication standard may further define packet detection bandwidths and/or packet detection energy thresholds that correspond to the one or more reference transmission powers for a planned transmission bandwidth. The wireless standard may further define how variations from the reference transmission power correspond to changes in the corresponding energy detection threshold, and/or packet detection energy threshold. For example, if a reference transmission power P for a given transmission bandwidth corresponds to an energy detection threshold of X, then a wireless transmission standard may further define that use of a transmission power that is X dBm lower than the reference transmission power P allows use of a corresponding energy detection threshold that is up to Y dBm higher than the reference energy detection threshold for the reference transmission power P. In some aspects of block 810, the first back-off procedure may also be based on a transmission bandwidth of the first wireless message.

In some aspects, devices utilizing a lower transmission power than the reference power may utilize higher energy detection thresholds and/or packet detection energy thresholds (than a reference energy threshold for example) when determining the availability of a transmission channel. Use of a higher energy detection threshold and/or packet detection thresholds by relatively low transmit power devices may facilitate fairness in deferral or clear channel assessment decisions when these devices operate on a wireless medium including devices operating at a higher transmission power.

As discussed previously with respect to FIGS. 7A-C, some methods of clear channel assessment may result in unfair medium allocation between two devices operating with different transmission powers, in that a device operating with a lower transmission power may defer to a device operating with a higher transmission power. By adjusting a sensitivity/detection threshold based on a transmission power, the disclosed methods allow relatively low power devices to defer at a level proportionate to the level of interference their transmissions inject onto the wireless network, resulting in a more fair allocation of the wireless medium between devices.

In block 815, the wireless message is transmitted in response to a completion of the first back-off procedure. The wireless message is transmitted based on at least the transmit power level. In some aspects, the wireless message is transmitted at the transmit power level.

Some aspects of process 800 may be performed in response to an event. For example, in some aspects, a determination is made that a wireless message is ready for transmission on a wireless network. In some aspects, the wireless message may be buffered by an application program at a network or transport layer within a device performing process 800. In these aspects, process 800 may be performed in response to the determination that a message (such as the first wireless message recited in block 810) is ready for transmission.

In some other aspects of process 800, a different event may be determined to occur. For example, some aspects of process 800 may preemptively perform a first back-off procedure (as discussed above with respect to block 810) before a wireless message is ready to be transmitted. For example, process 800 may be performed after transmission of a first message but before a second message is buffered or ready to be transmitted. In these aspects, if a message is buffered after the start of the first back-off procedure, and/or or during the first back-off procedure, the message may still be transmitted when then the back-off procedure completes. Some implementations may parallelize the back-off procedure with other processing necessary to prepare a wireless message for transmission.

Figure 8B:
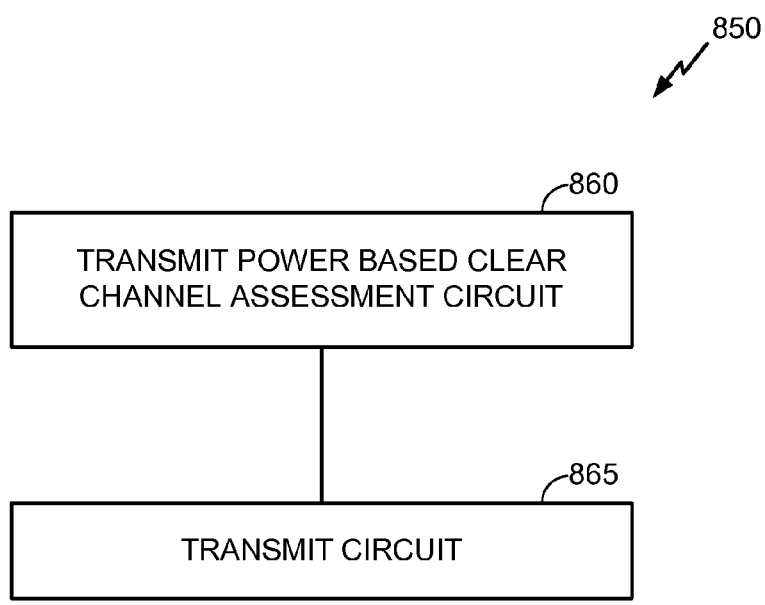
FIG. 8B is a functional block diagram of a wireless apparatus that may be employed within the wireless communication system of FIG. 2.

FIG. 8B is a functional block diagram that may be employed within the wireless communication device 202 of FIG. 2. Those skilled in the art will appreciate that a wireless communication apparatus may have more components than the simplified wireless communication apparatus 850 shown in FIG. 8B. The wireless communication apparatus 850 shown includes only those components useful for describing some prominent features of implementations within the scope of the claims. The wireless communication apparatus 850 may include a transmit power based clear channel assessment circuit 860, and a transmit circuit 865.

In some implementations, the transmit power based clear channel assessment circuit 860 may be configured to perform one or more of the functions discussed above with respect to block 810. The transmit power based clear channel assessment circuit 860 may include one or more of a programmable chip, a processor, a memory, and a network interface. For example, the transmit power based clear channel assessment circuit 860 may include the processor 204 or the selective CCA circuit 228. In some implementations, a means for performing a back-off procedure based on a transmit power may include the transmit power based clear channel assessment circuit 860.

In some implementations, the transmit circuit 865 may be configured to perform one or more of the functions discussed above with respect to block 815. The transmit circuit 865 may include one or more of a programmable chip, a processor, a memory, and a network interface. For example, the transmit circuit 865 may include the transmitter 210 or the processor 204. In some implementations, a means for transmitting based on a transmit power may include the transmit circuit 865.

Figure 9A:
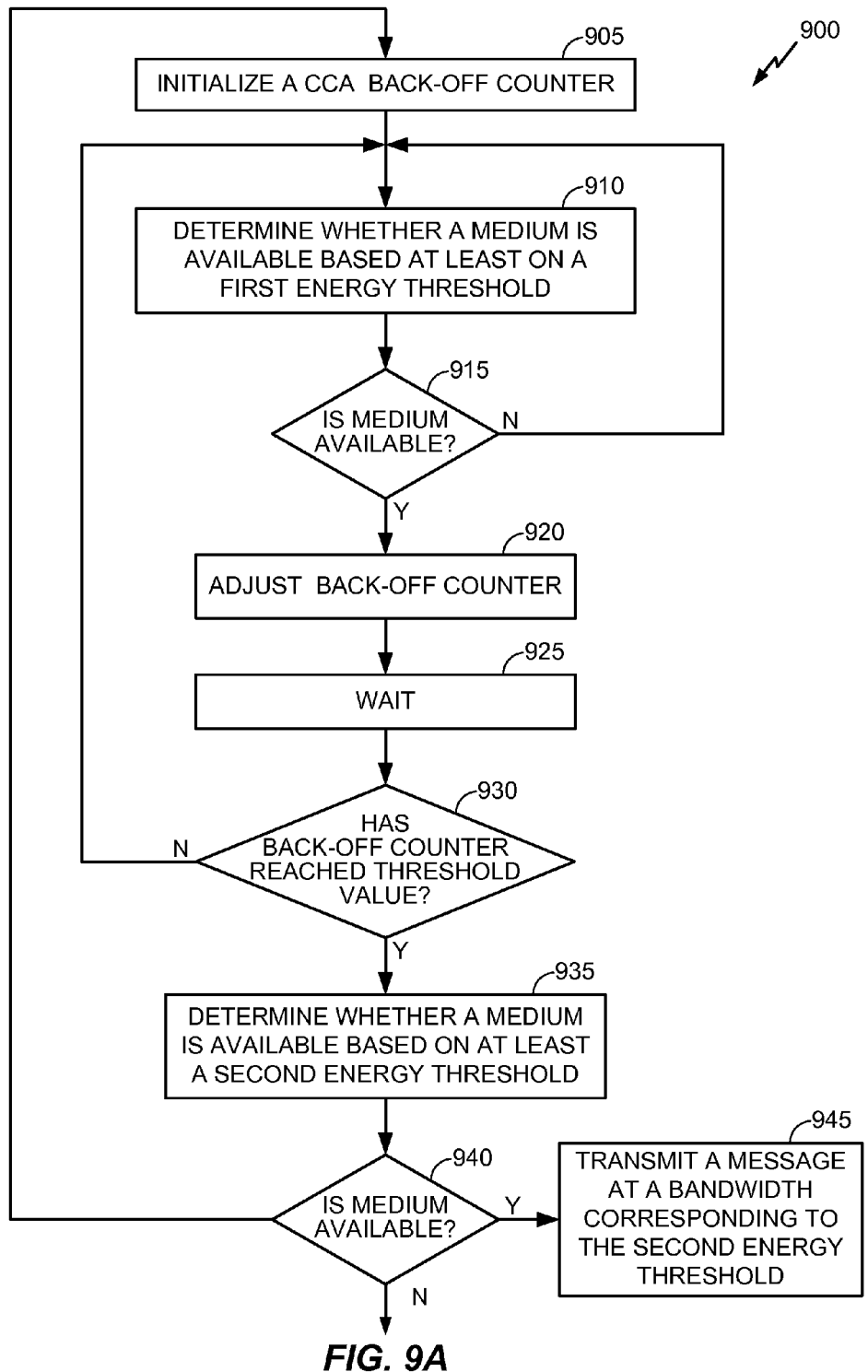
FIG. 9A is a flowchart of one implementation of a method of clear channel assessment. In one aspect, process 900 may be performed by the wireless device 202 of FIG. 2.

FIG. 9A is a flowchart of one implementation of a method of clear channel assessment. In one aspect, process 900 may be performed by the wireless device 202 of FIG. 2. In some aspects, process 900 may be performed by block 810 of FIG. 8A. In other aspects, process 900 may be performed as part of a clear channel assessment process that is not necessarily based on a transmit power.

In block 905, a clear channel assessment back-off counter is initialized. In block 910, a determination is made as to whether a wireless medium is available based at least on a first energy threshold. For example, block 910 may determine whether energy on the medium within a particular bandwidth is above the energy threshold. If the energy is above the energy threshold, the medium may be determined to be busy, or not available. If the energy on the medium is below the energy threshold, the medium may be considered to be available.

In some aspects, determining whether a medium is available may further include detection of one or more Wi-Fi packets on the medium. In these aspects, if one or more Wi-Fi packets are detected on the medium, the medium may be determined to be unavailable. In some aspects, a medium may represent a particular bandwidth of a wireless medium. For example, block 910 may determine only whether a particular frequency bandwidth of a wireless medium is available. In these aspects, block 910 may determine whether one or more of a 1 Mhz, 2 Mhz, 4 Mhz, 8 Mhz, 16 Mz, 20 Mhz, 40 Mhz, 80 Mhz frequency band is available for transmission.

In some aspects, block 910 may determine whether a medium is available based on a first transmission bandwidth. The first transmission bandwidth may be associated with one or more availability detection parameters utilized by block 910. For example, availability detection parameters may include an energy detection threshold, and/or a packet detection bandwidth, and/or packet detection energy threshold, as discussed above. In some aspects, block 910 may employ one or more of the determinations disclosed in process 600 of FIG. 6 in determining whether a medium is available.

Decision block 915 determines whether the medium is available based on at least the determination made in block 910. If the medium is available, block 920 adjusts the back-off counter. Adjusting the back-off counter may include "decrementing" the back-off counter, or adjusting the back-off counter towards a back-off process terminating value. If the medium is not available, process 900 returns to block 910 where the availability of the medium is determined again.

In block 925, process 900 waits for a period of time. In some aspects, block 925 is not performed. Block 930 determines whether the back-off counter has reached a threshold value. If it has not reached the threshold value, process 900 returns to block 910. If the back-off counter has reached a threshold value, block 935 determines whether the medium is available based at least on a second energy threshold.

In some aspects, block 935 may measure an amount of energy present on the medium within a particular bandwidth. A wireless communication standard may establish a correspondence between the second energy threshold and the particular bandwidth. To determine whether the medium is available, block 935 may compare the energy within the particular bandwidth with the second energy threshold. If the energy present is above the second energy threshold, the medium may be determined to be unavailable, whereas if the energy present is below the second energy threshold, the medium may be determined to be available. As discussed above, a determination of whether a medium is available may further comprise determining whether one or more Wi-Fi packets are detected on the medium. In some aspects, the detection operates within a particular frequency range as discussed above. If one or more Wi-Fi packets are detected within the detection frequency range, the medium may be determined to be unavailable. In some aspects, block 935 may determine whether a medium is available based on a second transmission bandwidth. The second transmission bandwidth may be associated with one or more second availability detection parameters utilized by block 935. For example, second availability detection parameters may include a second energy detection threshold, and/or a second packet detection bandwidth, and/or second packet detection energy threshold, as discussed above. Block 935 may utilize one or more of the determinations/conditions disclosed with respect to process 600 of FIG. 6 in making the determination.

If the medium is determined to be available, the message is transmitted at a bandwidth corresponding to the second energy threshold in block 945.

Otherwise, process 900 returns to block 905 where the back-off counter is reinitialized. This contrasts with other methods that may transmit on a transmission bandwidth corresponding to the first energy threshold if the medium is determined to be unavailable based on at least the second energy threshold. For example, in some other methods, a back-off procedure may be performed based on energy thresholds corresponding to a primary channel. When the back-off procedure is complete, devices may check to see if one or more secondary channels are available for transmission. Checking the availability of these secondary channels may be based on one or more energy thresholds different from the energy threshold used to perform the back-off procedure. If the secondary channels are not available, devices utilizing these other methods may transmit on the primary channel. However, in the disclosed method of process 900, an additional back-off procedure is performed. This may result in a reduced number of collisions and associated retransmission relative to the other methods.

Figure 9B:
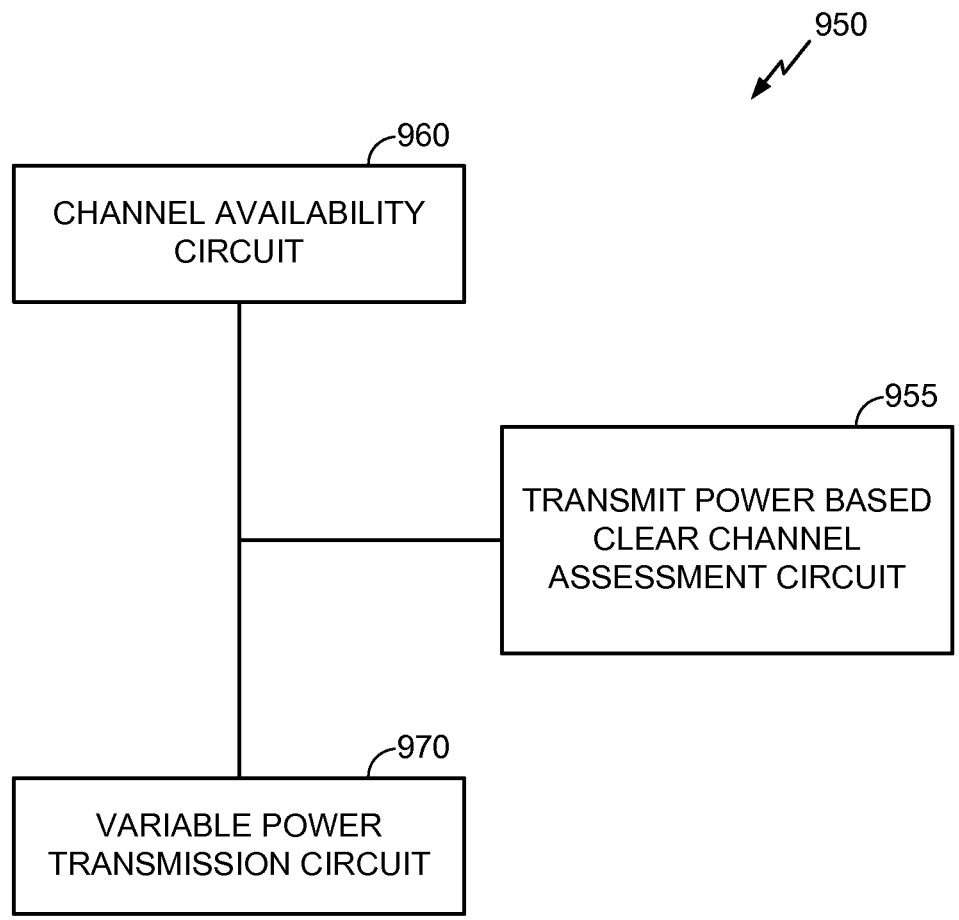
FIG. 9B is a functional block diagram of a wireless apparatus that may be employed within the wireless communication system of FIG. 2.

FIG. 9B is a functional block diagram that may be employed within the wireless communication device 202 of FIG. 2. Those skilled in the art will appreciate that a wireless communication apparatus may have more components than the simplified wireless communication apparatus 950 shown in FIG. 9B. The wireless communication apparatus 950 shown includes only those components useful for describing some prominent features of implementations within the scope of the claims. The wireless communication apparatus 950 may include a transmit power based clear channel assessment circuit 955, a channel availability circuit 960, and a variable power transmission circuit 970.

In some implementations, the transmit power based clear channel assessment circuit 955 may be configured to perform one or more of the functions discussed above with respect to blocks 910-915. The transmit power based clear channel assessment circuit 955 may include one or more of a programmable chip, a processor, a memory, and a network interface. For example, the transmit power based clear channel assessment circuit 955 may include the processor 204 or the selective CCA circuit 228. In some implementations, a means for determining a whether a channel is available may include the channel availability circuit 960.

In some implementations, the channel availability circuit 960 may be configured to perform one or more of the functions discussed above with respect to blocks 905-940. The channel availability circuit 960 may include one or more of a programmable chip, a processor, a memory, and a network interface. For example, the channel availability circuit 960 may include the processor 204 or the selective CCA circuit 228. In some implementations, a means for determining a whether a channel is available may include the channel availability circuit 960.

In some implementations, the variable power transmission circuit 970 may be configured to perform one or more of the functions discussed above with respect to block 945. The variable power transmission circuit 970 may include one or more of a programmable chip, a processor, a memory, and a network interface. For example, the variable power transmission circuit 970 may include the transmitter 210. In some implementations, a means for transmitting a message at a particular bandwidth and/or power level may include the variable power transmitting circuit 970.

Figure 10A:
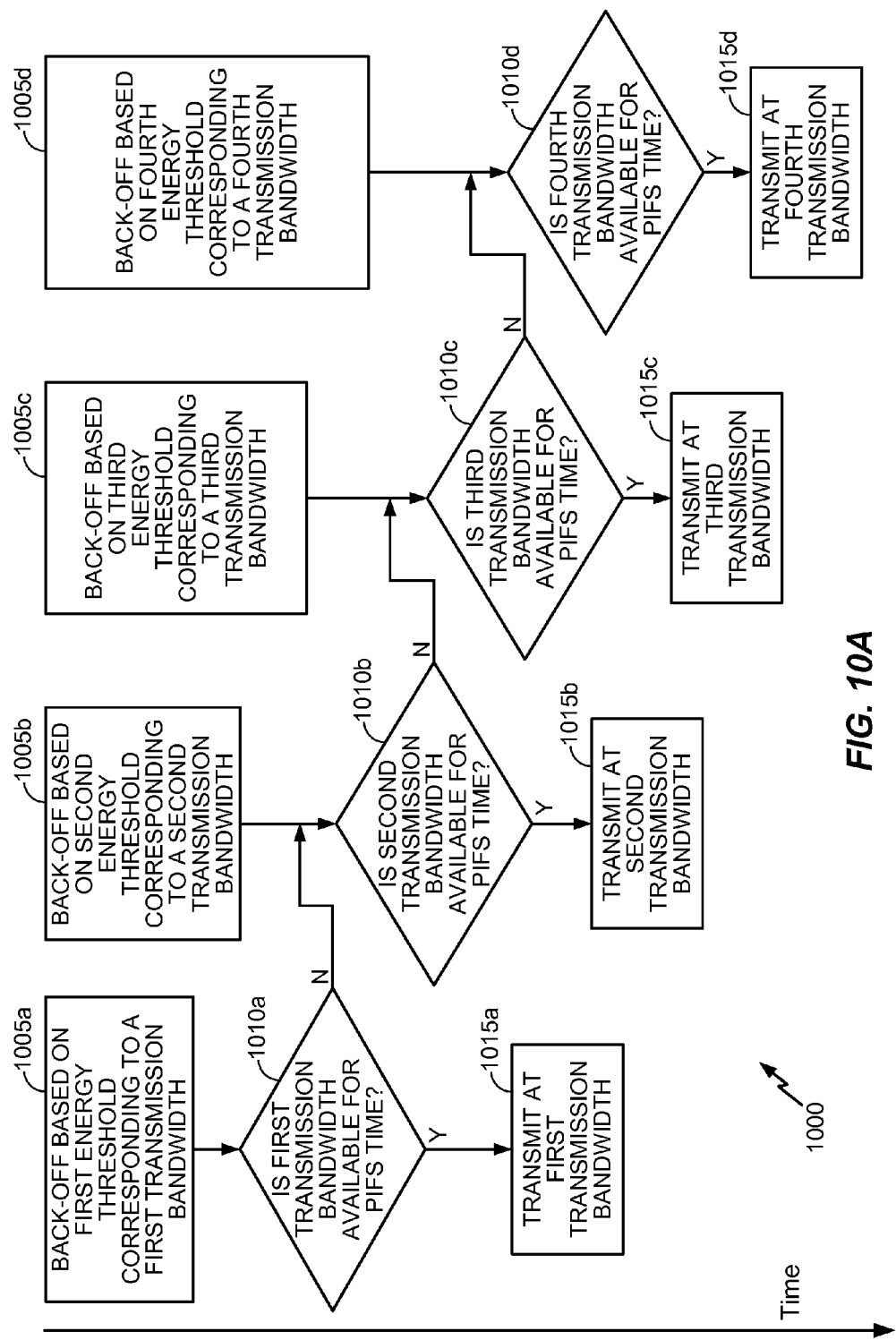
FIG. 10A is a flowchart of one implementation of clear channel assessment.

FIG. 10A is a flowchart of one implementation of clear channel assessment. In one aspect, process 1000 is performed by the device 202 illustrated in FIG. 2. In some aspects, process 1000 may be performed by block 810 of FIG. 8A. In other aspects, process 1000 may be performed as part of a different clear channel assessment process. For example, process 1000 may be performed as part of a clear channel assessment process that is not based on a transmission power.

Flowchart 1000 illustrates that four back-off procedures are performed at least partially in parallel over time. Each of back-off procedures 1005*a-d* are performed at least partially simultaneously. In some aspects, each back-off procedure may be performed in a separate execution thread or run on a different processor, resulting in true parallel execution. In some other aspects, two or more of the back-off procedures may be performed within a single thread of execution. This single thread of execution may track the at least two back-off procedures through the use of multiple back-off counters and by application of at least two sets of back-off parameters, for example, multiple energy thresholds corresponding to the at least two back-off procedures.

In the illustrated example of process 1000, back-off procedure 1005*d* consumes the most elapsed time to complete, followed by back off procedure 1005*c*, 1005*b*, and 1005*a* respectively. In some aspects, each of back-off procedures 1005*a-d* are based on different transmission bandwidths. For example, each of back-off procedures 1005*a-d* may utilize a different energy threshold to determine whether the medium is available. Each of back-off procedures 1005*a-d* may also utilize a different frequency range on the wireless medium to detect energy. Each of back-off procedures 1005*a-d* may further utilize different frequency ranges to perform packet detection. In some aspects, each of back-off procedures 1005*a-d* is utilized to perform clear channel assessment on a different transmission bandwidth. For example back-off procedures 1005*a-d* may correspond to transmission bandwidths of 20 Mhz, 40 Mhz, 60 Mhz, and 80 Mhz respectively. In some other aspects, back-off procedures 1005*a-d* may correspond to transmission bandwidths of 1 Mhz, 2 Mhz, 4 Mhz, and 16 Mhz respectively.

After back-off procedure 1005*a* completes, decision block 1010*a* determines whether the first transmission bandwidth is available for a period of time. For example, decision block 1010*a* may make multiple measurements of energy within the first transmission bandwidth. If the measurements of energy within the first transmission bandwidth are above a first energy threshold corresponding to the first transmission bandwidth, the first transmission bandwidth may be determined to be unavailable. In some aspects, decision block 1010*a* may also perform packet detection within the first transmission bandwidth to determine whether the first transmission bandwidth is available. As discussed above, if packets are detected within the first transmission bandwidth, block 1010*a* may determine the first transmission bandwidth is unavailable.

In the illustrated aspect, the period of time during which a determination of whether the first transmission bandwidth is available is a Point Coordination Function Interframe Space (PIFS) time. In other aspects, the period of time may be longer than a PIFS time. If the first transmission bandwidth is available, a transmission is performed at the first transmission bandwidth in block 1015*a*. If the first transmission bandwidth is not available at decision block 1010*a*, process 1000 waits for the back-off procedure 1005*b* to complete. After the back-off procedure 1005*b* completes, decision block 1010*b* determines whether the second transmission bandwidth is available for a PIFS time.

Decision block 1010*b* may make the determination in a similar manner as that described above with respect to block 1010*a*. However, since block 1010*b* is detecting whether the second transmission bandwidth is available, it may utilize an energy detection threshold associated with the second transmission bandwidth. This association may be provided, in some aspects, by a wireless communication standard utilizing the disclosed methods and systems. In other aspects, the association may be provided by another wireless device, such as an access point. Block 1010*b* may also perform packet detection within the second transmission bandwidth when determining whether the second transmission bandwidth is available. If one or more packets are detected within the second transmission bandwidth, block 1010*b* may determine the second transmission bandwidth is not available.

If the second transmission bandwidth is available, a transmission is performed across the second transmission bandwidth in block 1015*b*. If the second transmission bandwidth is not available, process 1000 waits for back off procedure 1005*c* to complete. Upon completion of back-off procedure 1005*c*, decision block 1010*c* determines whether a third transmission bandwidth is available for a time period. Again the illustrated aspect utilizes a time period of PIFS but other time periods are contemplated.

Decision block 1010*c* may make the determination in a similar manner as that described above with respect to blocks 1010*a* and 1010*b*, except, as described above, block 1010*c* may utilize a third energy threshold corresponding to the third transmission bandwidth, and may perform packet detection within the third transmission bandwidth when determining whether the third transmission bandwidth is available.

If the third transmission bandwidth is determined to be available, a transmission at the third transmission bandwidth is performed in block 1015*c*. If the third transmission bandwidth is not available, process 1000 waits for back off procedure 1005*d* to complete.

When the back-off of 1005*d* is complete, decision block 1010*d* determines whether the fourth transmission bandwidth is available for a time period. As discussed above with respect to blocks 1010*a-c*, decision block 1010*d* may utilize a fourth energy threshold and perform packet detection within the fourth transmission bandwidth when determining whether the fourth transmission bandwidth is available. If the fourth transmission bandwidth is available, a transmission is performed at the fourth bandwidth.

While not shown by the flowchart of FIG. 10, if the fourth transmission bandwidth is not available in decision block 1010*d*, some implementations of process 1000 may return to performing each of back-off procedures 1005*a-d*. Some other implementations of process 1000 may perform a back-off procedure for a single bandwidth, for example, the bandwidth most likely to result in an availability determination.

By utilizing multiple back-off procedures executed at least partially in parallel, process 1000 may identify a most appropriate transmission channel without introducing unnecessary delay that would result in performing multiple back-off procedures serially. Additionally, the use of a back-off procedure specifically tailored for each potential transmission channel, via the use of energy detection thresholds corresponding to each potential transmission channel, may reduce the probability of collisions occurring when a channel is selected for transmission.

Each of the disclosed transmission bandwidths above with respect to FIG. 10A may each be different transmission bandwidths. In some aspects, each of the first, second, and third transmission bandwidths may be associated with secondary channels on a wireless network. In some aspects, the fourth transmission bandwidth is associated with a primary channel on the wireless network.

In some aspects, the fourth transmission bandwidth is a lower bandwidth than the third, second or first transmission bandwidths. In some aspects, the second transmission bandwidth is wider than the third transmission bandwidth, and the third transmission bandwidth is wider than the fourth transmission bandwidth.

In some aspects, the physical bandwidth of the first transmission bandwidth overlaps the physical bandwidth of the fourth transmission bandwidth. For example, the first transmission bandwidth may be 16 Mhz in some implementations while the fourth transmission bandwidth is 2 Mhz in those implementations. In some aspects, the 16 Mhz of bandwidth of the first transmission bandwidth includes the physical frequency range of the 2 Mhz fourth transmission bandwidth. In some aspects, the second and third transmission bandwidths may overlap with the fourth transmission bandwidth in a similar manner.

Figure 10B:
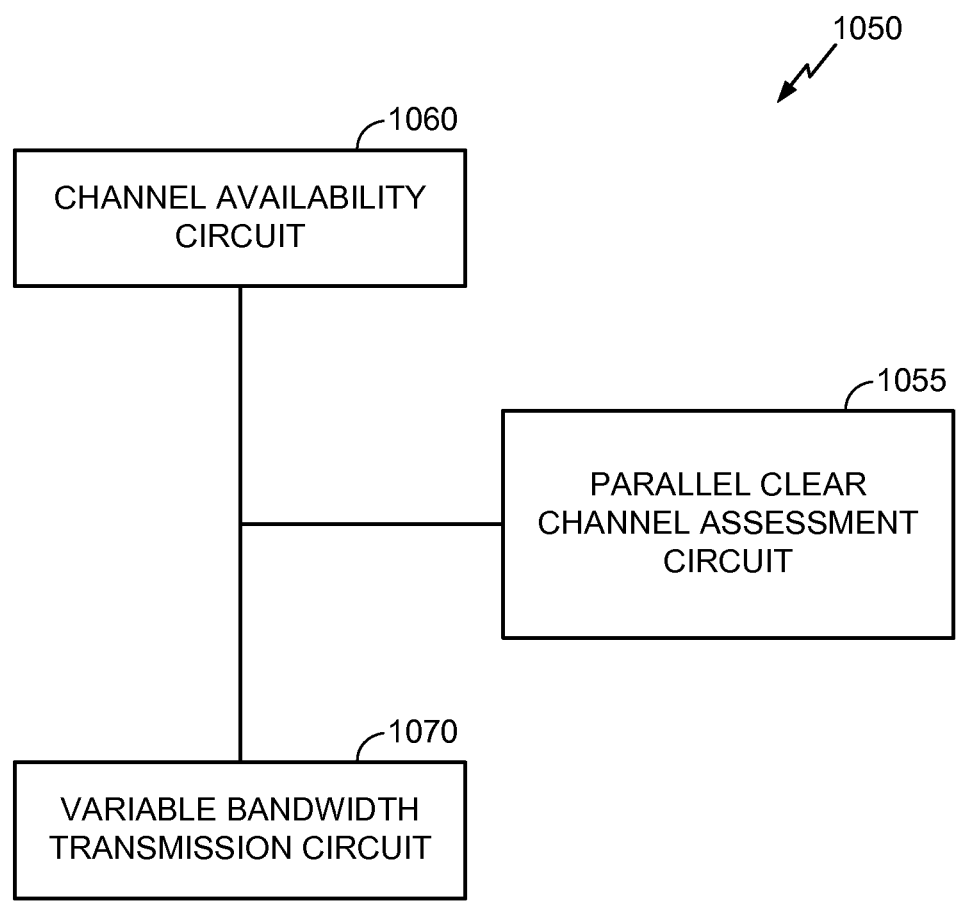
FIG. 10B is a functional block diagram of a wireless apparatus that may be employed within the wireless communication system of FIG. 2.

FIG. 10B is a functional block diagram of a wireless apparatus that may be employed within the wireless communication device 202 of FIG. 2. Those skilled in the art will appreciate that a wireless communication apparatus may have more components than the simplified wireless communication apparatus 1050 shown in FIG. 10B. The wireless communication apparatus 1050 shown includes only those components useful for describing some prominent features of implementations within the scope of the claims. The wireless communication apparatus 1050 may include a parallel clear channel assessment circuit 1055, a channel availability circuit 1060, and a variable bandwidth transmission circuit 1070.

In some implementations, the parallel clear channel assessment circuit 1055 may be configured to perform one or more of the functions discussed above with respect to blocks 1005a-d. The parallel clear channel assessment circuit 1055 may include one or more of a programmable chip, a processor, a memory, and a network interface. For example, the parallel clear channel assessment circuit 1055 may include the processor 204 or the selective CCA circuit 228. In some implementations, a means for performing a back-off procedure may include the parallel clear channel assessment circuit 1055.

In some implementations, the channel availability circuit 1060 may be configured to perform one or more of the functions discussed above with respect to blocks 1010a-d. The channel availability circuit 1060 may include one or more of a programmable chip, a processor, a memory, and a network interface. For example, the channel availability circuit 1060 may include the processor 204 or the selective CCA circuit 228. In some implementations, a means for determining whether a transmission bandwidth is available may include the channel availability circuit 1060.

In some implementations, the variable bandwidth transmission circuit 1070 may be configured to perform one or more of the functions discussed above with respect to blocks 1015a-d. The variable bandwidth transmission circuit 1070 may include one or more of a programmable chip, a processor, a memory, and a network interface. For example, the variable bandwidth transmission circuit 1070 may include the transmitter 210. In some implementations, a means for transmitting over a particular bandwidth may include the variable bandwidth transmission circuit 1070.

Figure 11A:
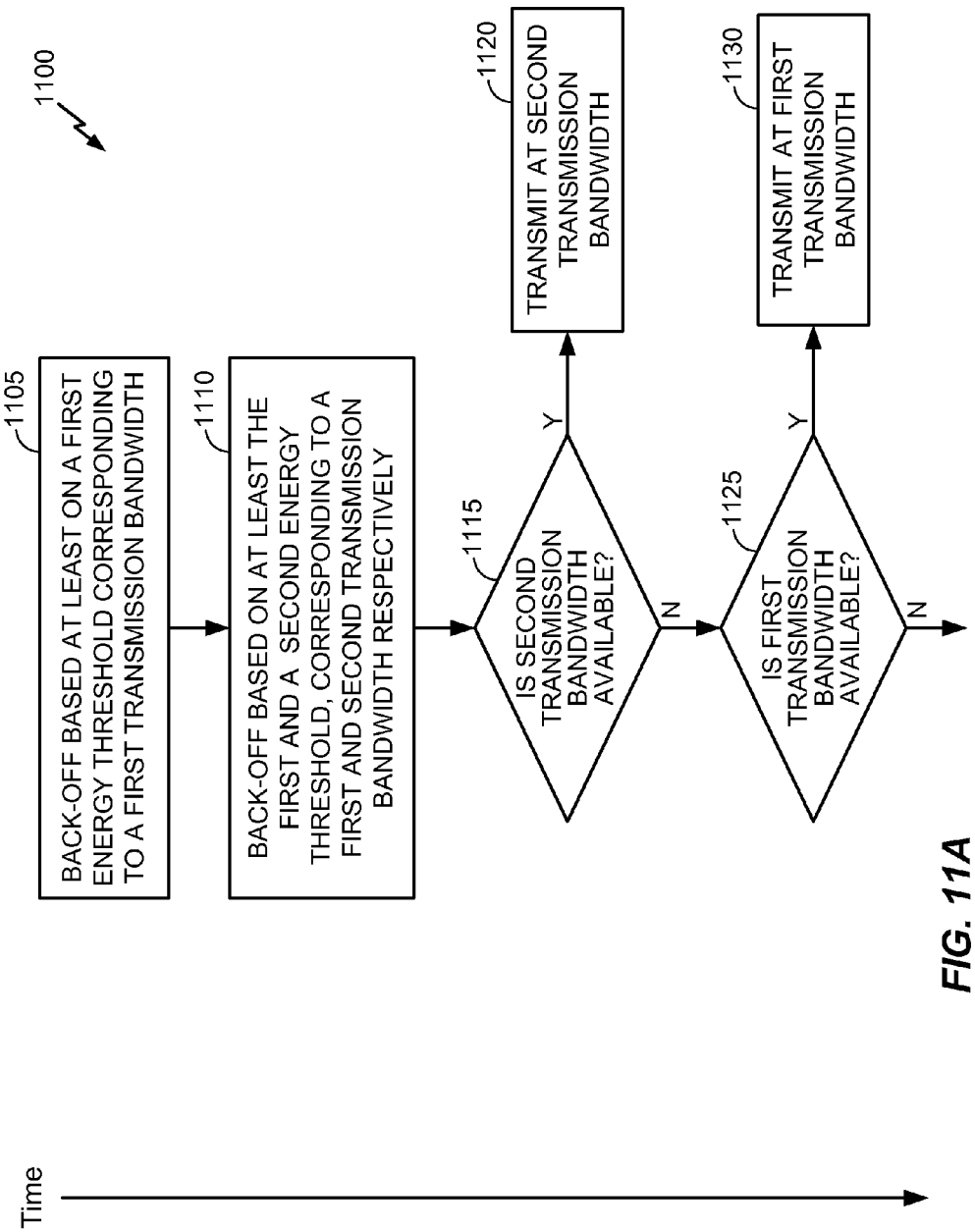
FIG. 11A illustrates one example implementation of a method of clear channel assessment on a wireless medium.

FIG. 11A illustrates one example implementation of a method of clear channel assessment on a wireless medium. In one aspect, process 1100 may be performed by the wireless device 202 illustrated in FIG. 2. In some aspects, process 1100 may be performed by block 810 of FIG. 8A. In other aspects, process 1100 may be performed as part of a different clear channel assessment process. For example, process 1100 may be performed as part of a clear channel assessment process that is not based on a transmission power.

In block 1105, a back-off procedure is performed based on at least a first energy threshold corresponding to a first transmission bandwidth. For example, a wireless communication standard may associate the first transmission bandwidth with the first energy detection threshold. The standard may specify that a detection of energy above the first energy detection threshold indicates that the first transmission bandwidth is not available. In one aspect, the energy detected may be energy included only within the first transmission bandwidth. In some aspects, the back-off may be further based on packet detection within the first transmission bandwidth. For example, a back-off may not be allowed to advance towards a completion status while packets are detected within the first transmission bandwidth. In some aspects, the back-off is based on at least the first transmission bandwidth. As explained above, a set of back-off parameters may be associated with a transmission bandwidth. The back-off parameters may include an energy detection threshold, packet detection energy threshold, and/or a packet detection bandwidth (typically equivalent to the transmission bandwidth).

In block 1110, a second back-off procedure is performed based on at least the first and a second transmission bandwidth. In some aspects, the second back-off procedure is performed based on at least the first and a second energy threshold. In some aspects, the second back-off procedure may be performed based on at least the second transmission bandwidth only. For example, the second back-off procedure may measure energy within only the second transmission bandwidth and compare it with an energy threshold corresponding to the second transmission bandwidth. The back-off may not proceed toward a completion status if the energy within the second transmission bandwidth is above the second energy threshold. The second back-off may also not proceed toward a completion status while packets are detected within the second transmission bandwidth. In some aspects, the second energy threshold may be lower than the first energy threshold, therefore rendering the first energy threshold redundant in some aspects.

In some other aspects, the second back-off procedure of block 1110 may determine an amount of energy within the first transmission bandwidth relative to the first energy threshold, and determine an amount of energy within the second transmission bandwidth relative to the second energy threshold. The back-off of block 1110 may then be based on whether the amount of energy detected within each band exceeds its respective energy threshold. In some aspects, the second back-off may be further based on whether packets are detected within the first transmission bandwidth and whether packets are detected within the second transmission bandwidth.

In some aspects, the second back-off procedure may track multiple back-off counters that utilize multiple corresponding energy thresholds. The second back-off procedure may complete based on at least the multiple back-off counters. For example, the first back-off counter to reach a completion threshold may trigger the completion of the second back-off procedure.

After the second back-off procedure completes, decision block 1115 determines whether the second transmission bandwidth is available. In some aspects, decision block 1115 may determine the availably of the second transmission bandwidth over a PIFS time period to determine whether it is available. In some aspects, the determination of block 1115 may be based on at least the second energy threshold and/or packet detection within the second transmission bandwidth, as discussed previously with regard to other bandwidth availability determinations. If it is available, a transmission at the second transmission bandwidth is performed in block 1120. If the second transmission bandwidth is not available in decision block 1115, decision block 1125 determines whether the first transmission bandwidth is available. In some aspects, decision block 1125 may determine the availability of the first transmission bandwidth over a PIFS time period. In some aspects, the determination of block 1125 may be based on at least the first energy threshold and packet detection within the first transmission bandwidth, as discussed previously with regard to other bandwidth availability determinations. If the first transmission bandwidth is available, a transmission at the first transmission bandwidth is performed in block 1130. In some aspects, the first transmission bandwidth is lower than the second transmission bandwidth. Otherwise, process 1100 continues processing. In some aspects, process 1100 may return to one of blocks 1105 or 1110.

By performing at least a portion of a back-off procedure based on energy thresholds corresponding to one or more secondary transmission bandwidths, process 1100 may increase the probability that a secondary channel is available for transmission when the combined back-off procedures of blocks 1105 and 1110 are complete.

Each of the disclosed transmission bandwidths above with respect to the discussion of FIG. 11A may each be different transmission bandwidths. In some aspects, the second transmission bandwidth is associated with a secondary channel on the wireless network while the first transmission bandwidth is associated with a primary channel on the wireless network. In some aspects, the first transmission bandwidth is a lower bandwidth than the second transmission bandwidth. In some aspects, the physical bandwidth of the second transmission bandwidth overlaps the physical bandwidth of the first transmission bandwidth. For example, the second transmission bandwidth may be 16 Mhz in some implementations while the first transmission bandwidth is 2 Mhz in those implementations. In some aspects, the 16 Mhz of bandwidth of the second transmission bandwidth includes the physical frequency range of the 2 Mhz first transmission bandwidth.

Figure 11B:
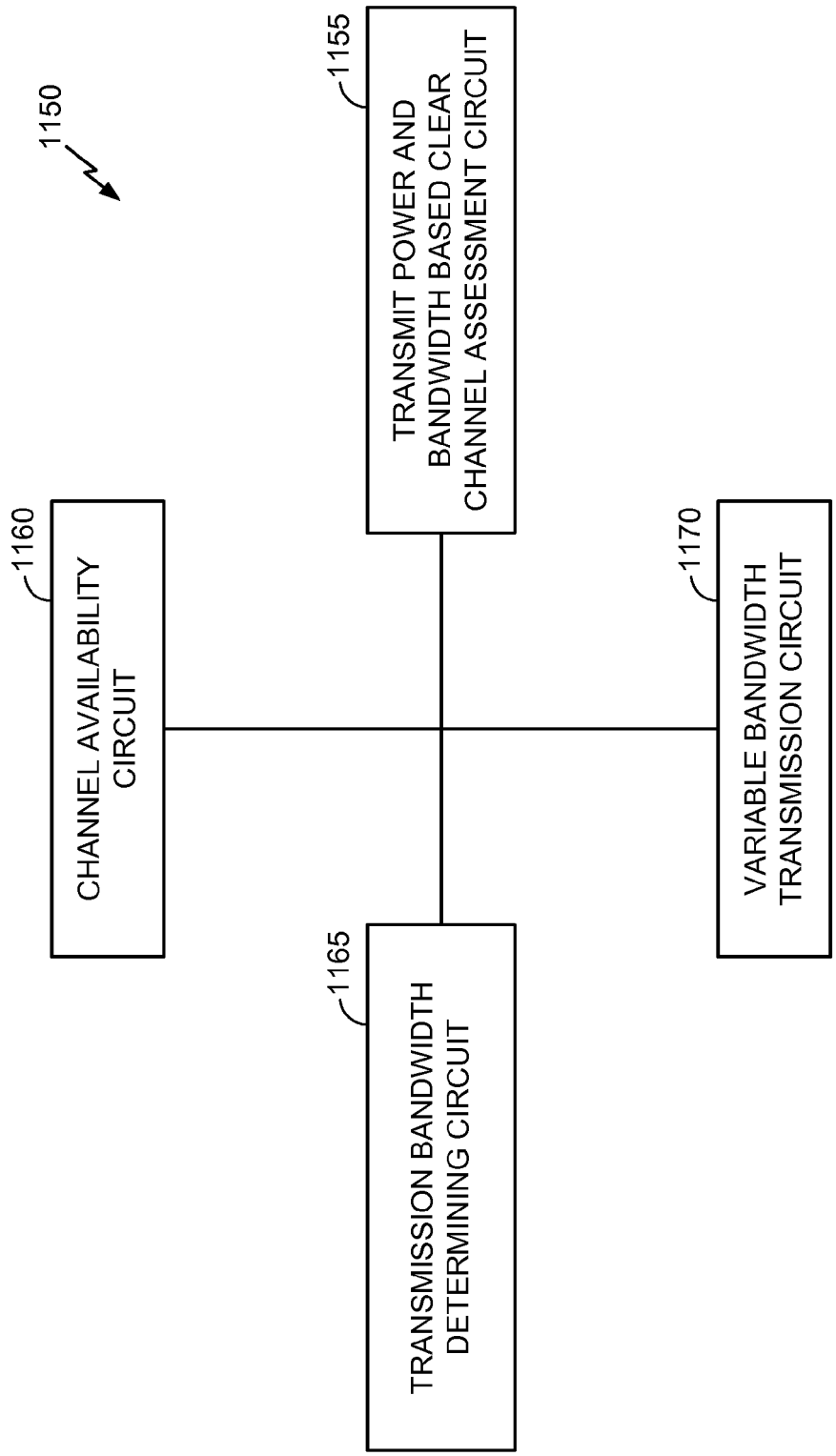
FIG. 11B is a functional block diagram of a wireless apparatus that may be employed within the wireless communication system of FIG. 2.

FIG. 11B is a functional block diagram of a wireless apparatus that may be employed within the wireless communication device 202 of FIG. 2. Those skilled in the art will appreciate that a wireless communication apparatus may have more components than the simplified wireless communication apparatus 1150 shown in FIG. 11B. The wireless communication apparatus 1150 shown includes only those components useful for describing some prominent features of implementations within the scope of the claims. The wireless communication apparatus 1150 may include a transmission power and bandwidth based clear channel assessment circuit 1155, a channel availability circuit 1160, a transmission power and bandwidth determining circuit 1165, and a variable bandwidth transmission circuit 1170.

In some implementations, the transmission power and bandwidth clear channel assessment circuit 1155 may be configured to perform one or more of the functions discussed above with respect to blocks 1105 and 1110. The transmission power and bandwidth clear channel assessment circuit 1155 may include one or more of a programmable chip, a processor, a memory, and a network interface. For example, the transmission power and bandwidth clear channel assessment circuit 1155 may include the processor 204 or the selective CCA circuit 228. In some implementations, a means for performing a back-off procedure may include the transmission power and bandwidth clear channel assessment circuit 1155.

In some implementations, the channel availability circuit 1160 may be configured to perform one or more of the functions discussed above with respect to blocks 1115 and/or 1125. The channel availability circuit 1160 may include one or more of a programmable chip, a processor, a memory, and a network interface. For example, the channel availability circuit 1160 may include the processor 204 or the selective CCA circuit 228. In some implementations, a means for determining whether a particular channel is available may include the channel availability circuit 1160.

In some implementations, the transmission bandwidth determining circuit 1165 may be configured to perform one or more of the functions discussed above with respect to blocks 1115 and/or 1125. The transmission bandwidth determining circuit 1165 may include one or more of a programmable chip, a processor, a memory, and a network interface. For example, the transmission bandwidth determining circuit 1165 may include the processor 204 or the selective CCA circuit 228. In some implementations, a means for determining a transmission bandwidth may include the transmission bandwidth determining circuit 1165.

In some implementations, the variable bandwidth transmission circuit 1170 may be configured to perform one or more of the functions discussed above with respect to blocks 1120 and/or 1130. The variable bandwidth transmission circuit 1170 may include one or more of a programmable chip, a processor, a memory, and a network interface. For example, the variable bandwidth transmission circuit 1170 may include the transmitter 210. In some implementations, a means for transmitting at a transmission bandwidth may include the variable bandwidth transmission circuit 1170.

Figure 12A:
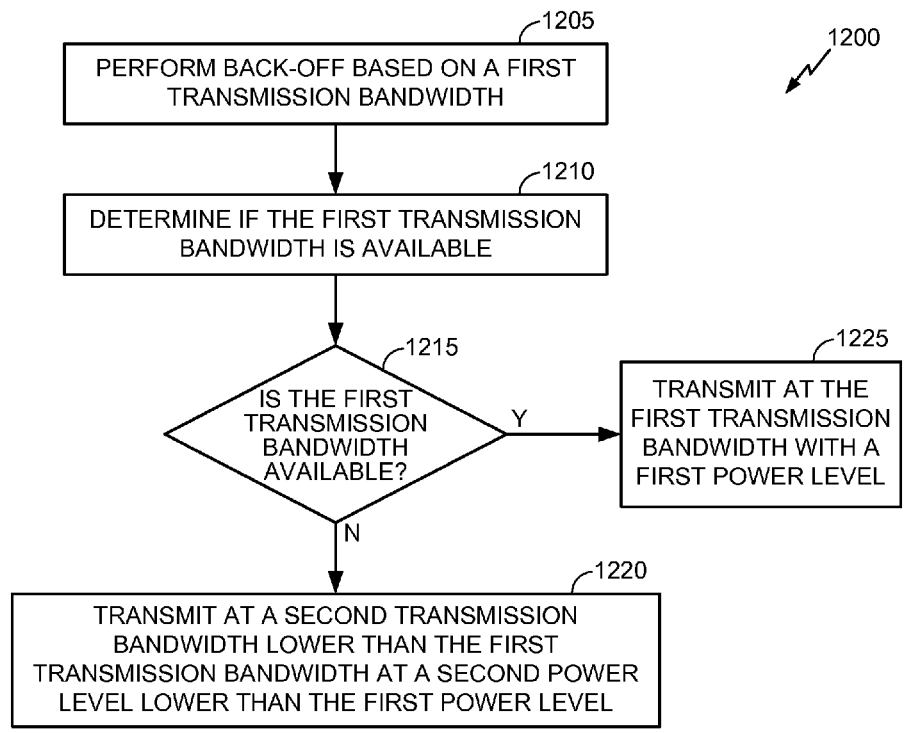
FIG. 12A illustrates one example implementation of a method of transmit power based clear channel assessment on a wireless medium.

FIG. 12A illustrates one example implementation of a method of transmit power based clear channel assessment on a wireless medium. In one aspect, process 1200 may be performed by the wireless device 202 illustrated in FIG. 2. In some aspects, process 1200 may be performed by block 810 of FIG. 8A. In other aspects, process 1200 may be performed as part of a different clear channel assessment process. For example, process 1200 may be performed as part of a clear channel assessment process that is not based on a transmission power.

In block 1205, a back-off procedure is performed based on a first transmission bandwidth. In some aspects, the back-off procedure may be based on a first energy threshold. As discussed above, an energy threshold may correspond to a transmission bandwidth based on a communication standard. For example, the communication standard may indicate that a particular energy threshold is used to determine whether a particular transmission bandwidth is available. The particular energy threshold may then be said to correspond to the particular transmission bandwidth. In some aspects, the back-off procedure of block 1205 may be based on at least a measurement of energy within the first transmission bandwidth. This measurement of energy within the first transmission bandwidth may be compared to the first energy threshold to determine whether a back-off procedure should advance in some aspects. In some aspects, the back-off may be further based on packet detection within the first transmission bandwidth. For example, the back-off of block 1205 may not be allowed to advance while packets are detected within the first transmission bandwidth in some aspects.

Block 1210 determines whether the first transmission bandwidth is available. This determination may be based on at least the first energy threshold discussed above, and/or packet detection on the first transmission bandwidth. In some aspects, the availability of the first transmission bandwidth may be based on a measurement of energy within the first transmission bandwidth. This measurement of energy within the first transmission bandwidth may be compared to the first energy threshold in some aspects. If the measurement is above the threshold, the first transmission bandwidth is not available in some aspects. If the measurement of energy is below the first energy threshold, the first transmission bandwidth is available in some aspects. In some aspects, availability of the first transmission bandwidth may be based on packet detection within the first transmission bandwidth. For example, if packets are detected within the first transmission bandwidth, block 1210 may determine the first transmission bandwidth is unavailable.

If the first transmission bandwidth is available in block 1215, a transmission is performed at the first transmission bandwidth with a first power level. If the first transmission bandwidth is not available, a transmission is performed at a second transmission bandwidth, but with a second power level that is lower than the first power level.

Because block 1220 transmits on the second transmission bandwidth which is lower than the first transmission bandwidth, if block 1220 transmitted with an equivalent power level, the energy per bandwidth injected into the second transmission bandwidth would be higher than may be assumed in the design considerations of the back-off performed in block 1205. In some aspects, the first transmission bandwidth of FIG. 12A is a secondary channel on the wireless network. In some aspects, the second transmission bandwidth of FIG. 12A is a primary channel on the wireless network. In other aspects, the second transmission bandwidth may be a different secondary channel than the first transmission bandwidth.

By using a power level lower than the first power level, block 1220 injects potential interference into the wireless medium at a density within the second transmission bandwidth that is less than or equal to the density with which energy would be injected into the wider first transmission bandwidth when using the first power level. Therefore, the injected energy per frequency band is correlated with the back off performed in block 1205.

Figure 12B:
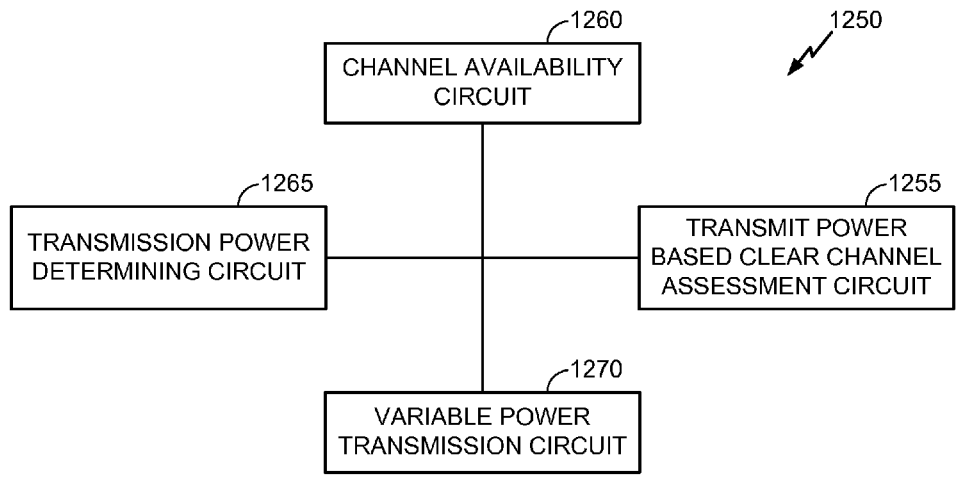
FIG. 12B is a functional block diagram of a wireless apparatus that may be employed within the wireless communication system of FIG. 2.

FIG. 12B is a functional block diagram of a wireless apparatus that may be employed within the wireless communication device 202 of FIG. 2. Those skilled in the art will appreciate that a wireless communication apparatus may have more components than the simplified wireless communication apparatus 1250 shown in FIG. 12B. The wireless communication apparatus 1250 shown includes only those components useful for describing some prominent features of implementations within the scope of the claims. The wireless communication apparatus 1250 may include a transmit power based clear channel assessment circuit 1255, a channel availability circuit 1260, a transmission power determining circuit 1265, and a variable power transmission circuit 1270.

In some implementations, the transmit power based clear channel assessment circuit 1255 may be configured to perform one or more of the functions discussed above with respect to block 1205. The transmit power based clear channel assessment circuit 1255 may include one or more of a programmable chip, a processor, a memory, and a network interface. For example, the transmit power based clear channel assessment circuit 1255 may include the selective CCA module 228 and/or the processor 204. In some implementations, a means for performing a back-off procedure may include the selective clear channel assessment circuit 1255.

In some implementations, the channel availability circuit 1260 may be configured to perform one or more of the functions discussed above with respect to block 1210. The channel availability circuit 1260 may include one or more of a programmable chip, a processor, a memory, and a network interface. For example, the channel availability circuit 1260 may include the selective CCA module 228 and/or the processor 204. In some implementations, a means for determining whether a channel is available may include the channel availability circuit 1260.

In some implementations, the transmission power determining circuit 1265 may be configured to perform one or more of the functions discussed above with respect to blocks 1220 and/or 1225. The transmission power determining circuit 1265 may include one or more of a programmable chip, a processor, a memory, and a network interface. For example, the transmission power determining circuit 1265 may include the selective CCA module 228 and/or the processor 204. In some implementations, a means for determining a transmission power may include the transmission power determining circuit 1265.

In some implementations, the variable power transmission circuit 1270 may be configured to perform one or more of the functions discussed above with respect to blocks 1220 and/or 1225. The variable power transmission circuit 1270 may include one or more of a programmable chip, a processor, a memory, and a network interface. For example, the variable power transmission circuit 1270 may include the transmitter 204. In some implementations, a means for transmitting at a transmit power may include the variable power transmission circuit 1270.

Figure 13A:
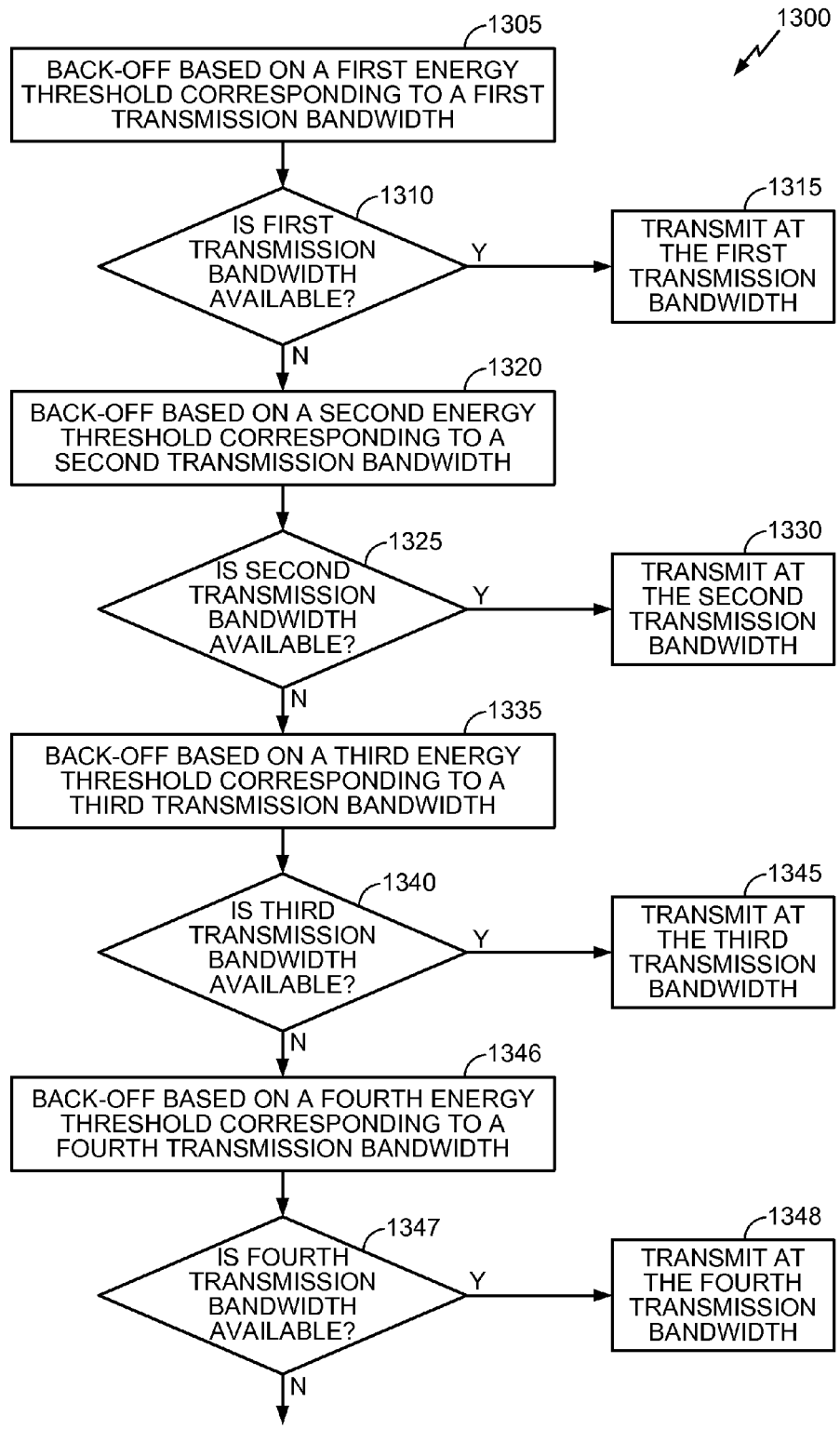
FIG. 13A illustrates one example implementation of a method of transmit power based clear channel assessment on a wireless medium.

FIG. 13A illustrates one example implementation of a method of transmit power based clear channel assessment on a wireless medium. In one aspect, process 1300 may be performed by the wireless device 202 illustrated in FIG. 2. In some aspects, process 1300 may be performed by block 810 of FIG. 8A. In other aspects, process 1300 may be performed as part of a different clear channel assessment process. For example, process 1300 may be performed as part of a clear channel assessment process that is not based on a transmission power.

In block 1305, a back-off procedure is performed based on at least a first energy threshold corresponding to a first transmission bandwidth. In some aspects, the back-off procedure of block 1305 is further based on packet detection within the first transmission bandwidth. For example, the back-off procedure may not advance while one or more packets are detected within the first transmission bandwidth. Because the back-off procedure is performed based on parameters such as an energy threshold, packet detection energy threshold, and/or packet detection bandwidth associated with the first transmission bandwidth, it can be said that the back-off procedure of block 1305 is based on at least the first transmission bandwidth.

After completion of the first back-off procedure in block 1305, decision block 1310 determines whether the first transmission bandwidth is available. This determination may be based on at least the first energy threshold. The first energy threshold may correspond to the first transmission bandwidth. For example, the first transmission bandwidth may be a secondary channel on the wireless network. The first energy threshold may be associated with clear channel assessment of the first transmission bandwidth.

In some aspects, the determination of availability in block 1310 may be further based on an energy threshold corresponding to a primary channel. For example, block 1310 may determine the availability of a primary channel as part of determining the availability of a secondary channel, as the secondary channel may rely on the primary channel for at least a portion of its transmission bandwidth.

The determination in block 1310 may also be based on packet detection within the first transmission bandwidth as discussed above with respect to the back-off procedure of block 1305. The packet detection may be based on packet detection threshold separate from the energy detection threshold(s). If the first transmission bandwidth is available, a message is transmitted at the first transmission bandwidth in block 1315.

If the first transmission bandwidth is not available at the completion of the first back-off procedure, a second back-off procedure is performed in block 1320 based on at least a second energy threshold corresponding to a second transmission bandwidth. In some aspects, the second back-off procedure may be further based on packet detection within the second transmission bandwidth. For example, the second back-off procedure may not advance while one or more packets are detected within the first transmission bandwidth. Because the second back-off procedure is performed based on parameters such as an energy threshold, packet detection energy threshold, and/or packet detection bandwidth associated with the second transmission bandwidth, it can be said that the second back-off procedure of block 1320 is based on at least the second transmission bandwidth. After completion of the second back-off procedure in block 1320, if the second transmission bandwidth is available, a transmission at the second transmission bandwidth is performed in block 1330.

Otherwise, a third back-off procedure is performed in block 1335 based on at least a third energy threshold corresponding to a third transmission bandwidth. Similar to the previously discussed back-off procedures, the third back-off procedure may be based on packet detection within the third transmission bandwidth. Because the third back-off procedure is performed based on parameters such as an energy threshold, packet detection energy threshold, and/or packet detection bandwidth associated with the third transmission bandwidth, it can be said that the third back-off procedure of block 1335 is based on at least the third transmission bandwidth. After completion of the third back-off procedure in block 1335, if the third transmission bandwidth is available, a transmission at the third transmission bandwidth is performed in block 1345. If the third transmission bandwidth is not available in block 1340, a fourth back-off procedure is performed in block 1346 based on at least a fourth energy threshold corresponding to a fourth transmission bandwidth. The fourth back-off procedure may be further based on packet detection within the fourth transmission bandwidth. Because the fourth back-off procedure is performed based on parameters such as an energy threshold, packet detection energy threshold, and/or packet detection bandwidth associated with the fourth transmission bandwidth, it can be said that the fourth back-off procedure of block 1346 is based on at least the fourth transmission bandwidth. After completion of the fourth back-off procedure in block 1346, if the fourth transmission bandwidth is available in block 1347, a transmission at the fourth transmission bandwidth is performed in block 1348. Otherwise, processing continues below. For example, in one aspect, process 1300 may return to block 1305.

In some aspects, the first, second, and third transmission bandwidths of FIG. 12A are secondary channels on a wireless network, while the fourth transmission bandwidth is a primary channel. In some other aspects, the fourth transmission bandwidth is also a secondary channel. In some aspects, the first transmission bandwidth is wider than the second transmission bandwidth, which is wider than the third transmission bandwidth, which is wider than the first transmission bandwidth. In some aspects, the two or more of the bandwidths discussed with respect to FIG. 13A may overlap. For example, if the fourth transmission bandwidth is a primary channel, transmitting over the first transmission bandwidth may also utilize the bandwidth associated with the primary channel.

Process 1300 may result in a reduced probability of collisions when compared to other methods that do not necessarily perform a back-off procedure specific to a secondary channel before transmitting on the secondary channel. By serially performing a back-off procedure corresponding to each potential transmission bandwidth before transmitting on that transmission bandwidth, process 1300 is designed to increase the probability that a secondary channel is idle before a transmission is initiated on the secondary channel.

Figure 13B:
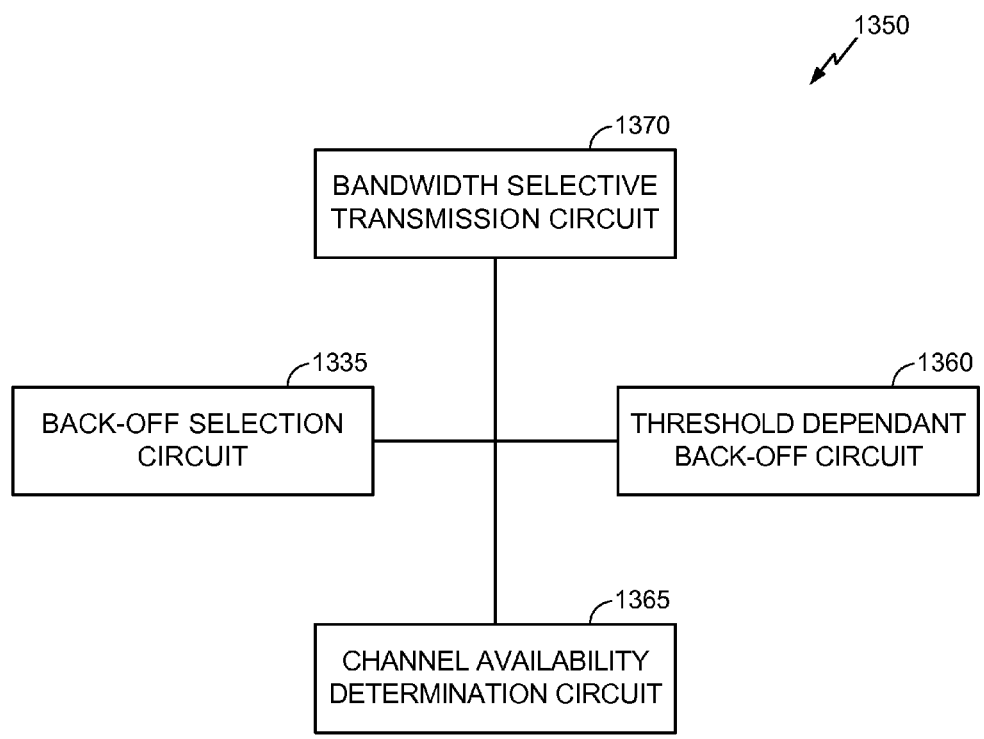
FIG. 13B is a functional block diagram of a wireless apparatus that may be employed within the wireless communication system of FIG. 2.

FIG. 13B is a functional block diagram of a wireless apparatus that may be employed within the wireless communication device 202 of FIG. 2. Those skilled in the art will appreciate that a wireless communication apparatus may have more components than the simplified wireless communication apparatus 1350 shown in FIG. 13B. The wireless communication apparatus 1350 shown includes only those components useful for describing some prominent features of implementations within the scope of the claims. The wireless communication apparatus 1350 may include a transmit power based back-off selection circuit 1355, a threshold dependent back-off circuit 1360, a channel availability determination circuit 1365, and a bandwidth selective transmission circuit 1370.

In some implementations, the transmit power based back-off selection circuit 1355 may be configured to perform one or more of the functions discussed above with respect to blocks 1305, 1320, 1335, and 1346. The back-off selection circuit 1355 may include one or more of a programmable chip, a processor, a memory, and a network interface. For example, the transmit power based back-off selection circuit 1355 may include the selective CCA module 228 and/or the processor 204. In some implementations, a means for selecting a back-off procedure may include the transmit power based back-off selection circuit 1355.

The device 1350 may be further configured to comprise a threshold dependent back-off circuit 1360. In some implementations, the threshold dependent back-off circuit 1360 may be configured to perform one or more of the functions discussed above with respect to blocks 1305, 1320, 1335, and 1346. The threshold dependent back-off circuit 1360 may include one or more of a programmable chip, a processor, a memory, and a network interface. For example, the threshold dependent back-off circuit 1360 may include the selective CCA module 228 and/or the processor 204. In some implementations, a means for backing off may include the threshold dependent back-off circuit 1360.

Device 1350 may be further configured to include a channel availability circuit 1365. The channel availability circuit 1365 may be configured to perform one or more of the functions of block 1310, 1325, 1340 and/or 1347 discussed above. The channel availability circuit 1365 may include one or more of a programmable chip, a processor, a memory, and a network interface. For example, the channel availability circuit 1365 may include the processor 204. In some implementations, a means for determining channel availability may include the transmit channel availability circuit 1365.

Device 1350 may be further configured to include a bandwidth selective transmission circuit 1370. The bandwidth selective transmission circuit 1370 may be configured to perform one or more of the functions of block 1315, 1330, 1345, and/or 1348 discussed above. The bandwidth selective transmission circuit 1370 may include one or more of a programmable chip, a processor, a memory, and a network interface. For example, the bandwidth selective transmission circuit 1370 may include the transmitter 210. In some implementations, a means for transmitting at a particular bandwidth may include the bandwidth selective transmission circuit 1370.

Figure 14A:
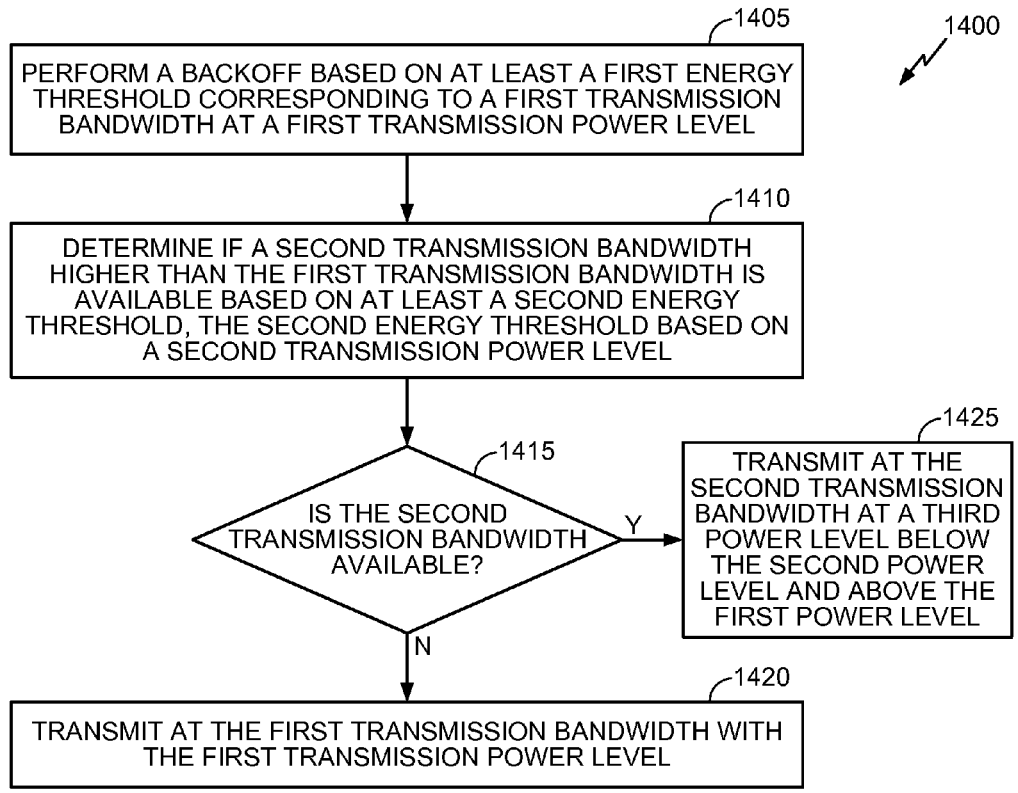
FIG. 14A illustrates one example implementation of a method of transmit power based clear channel assessment on a wireless medium.

FIG. 14A illustrates one example implementation of a method of transmit power based clear channel assessment on a wireless medium. In one aspect, process 1400 may be performed by the wireless device 202 illustrated in FIG. 2. In some aspects, process 1400 may be performed by block 810 of FIG. 8A. In other aspects, process 1400 may be performed as part of a different clear channel assessment process. For example, process 1400 may be performed as part of a clear channel assessment process that is not based on a transmission power.

In block 1405, a first back-off procedure is performed based at least on a first energy threshold corresponding to a first transmission bandwidth. The first back-off procedure is further based on a first transmission power level. The first back-off procedure may determine an amount of energy within the first transmission bandwidth, and make a relative comparison of the amount with the first energy threshold. If the amount of energy is above the energy threshold, the first back-off procedure may determine that the first transmission bandwidth is currently unavailable. This may prevent the back-off procedure from progressing until another measurement is performed that determines the first transmission bandwidth is available. For example, the back-off procedure may be preventing from progressing by not decrementing or otherwise adjusting a back-off counter until the first transmission bandwidth is determined to be available. In some aspects, the first back-off procedure may be further based on packet detection within the first transmission bandwidth. For example, while packets are detected within the first transmission bandwidth, the back-off procedure may be prevented from advancing toward a completion point. Because the back-off procedure is performed based on parameters such as an energy threshold, packet detection threshold, and/or packet detection bandwidth associated with the first transmission bandwidth, it can be said that the back-off procedure of block 1405 is based on at least the first transmission bandwidth.

After completion of the first back-off procedure, a determination of whether a second transmission bandwidth is available is performed. The second transmission bandwidth is higher than the first transmission bandwidth. The second back-off procedure is further based on a second energy threshold, which corresponds to the second transmission bandwidth. The second energy threshold may be further based on a second transmission power level that is higher than the first transmission power level. The determination of whether the second transmission bandwidth is available may include measuring an amount of energy present on the wireless medium within the second transmission bandwidth. This amount of energy may be compared relative to the second energy threshold. A wireless standard may associate the second energy threshold with the second transmission bandwidth. If the amount of energy exceeds the second energy threshold, block 1410 may determine that that second transmission bandwidth is not available. Alternatively, if the amount of energy is below the second energy threshold, block 1410 may determine that the second transmission bandwidth is available. In some aspects, the second back-off procedure may be further based on packet detection within the second transmission bandwidth. For example, while packets are detected within the second transmission bandwidth, the second back-off procedure may be prevented from advancing toward a completion point.

If the second transmission bandwidth is available in block 1415, block 1425 performs a transmission at the second transmission bandwidth at a third power level. The third power level is below the second power level and above the first power level. Because the back-off procedure performed in block 1405 was based on parameters corresponding to the first transmission bandwidth and power level, transmission over the second bandwidth is performed at a lower power level than might otherwise be "justified" by the determining of block 1410. For example, in some aspects, the back-off procedure of block 1405 may be shorter than would be the case if the back-off procedure of 1405 was performed based on an energy threshold corresponding to the second power level.

If the second transmission bandwidth is not available in block 1415, block 1420 performs a transmission over the first transmission bandwidth at the first transmission power level. Note that in some aspects, the second transmission bandwidth is wider than the first transmission bandwidth. In some aspects, the first transmission bandwidth may be a primary channel on a wireless network while the second transmission bandwidth is a secondary channel on the wireless network. In some aspects, the second transmission bandwidth includes the first transmission bandwidth. For example, transmitting over a 16 Mhz secondary channel may utilize a frequency range of the first transmission bandwidth.

Figure 14B:
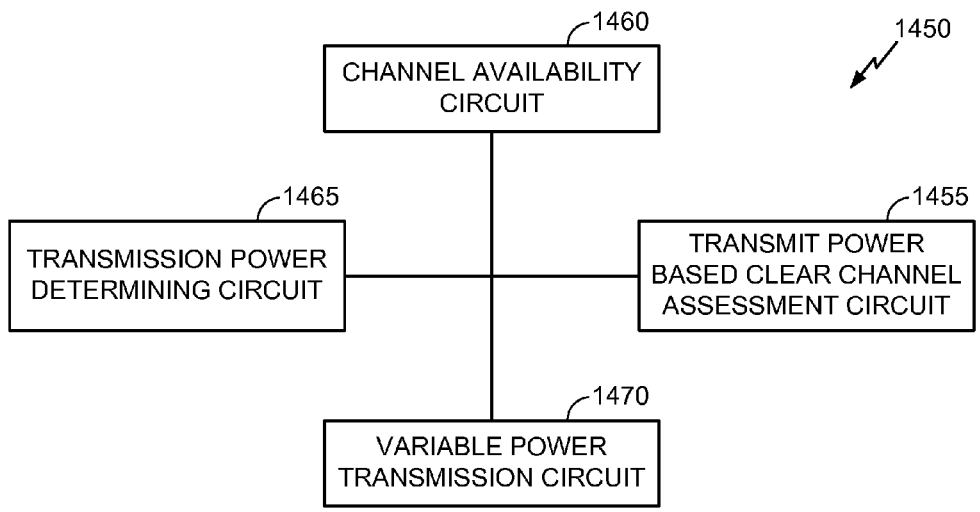
FIG. 14B is a functional block diagram of a wireless apparatus that may be employed within the wireless communication system of FIG. 2.

FIG. 14B is a functional block diagram of a wireless apparatus that may be employed within the wireless communication device 202 of FIG. 2. Those skilled in the art will appreciate that a wireless communication apparatus may have more components than the simplified wireless communication apparatus 1450 shown in FIG. 14B. The wireless communication apparatus 1450 shown includes only those components useful for describing some prominent features of implementations within the scope of the claims. The wireless communication apparatus 1450 may include a transmit power based clear channel assessment circuit 1455, a channel availability circuit 1460, transmission power determining circuit 1465, and a variable power transmission circuit 1470.

In some implementations, the transmit power based clear channel assessment circuit 1455 may be configured to perform one or more of the functions discussed above with respect to block 1405. The transmit power based clear channel assessment circuit 1455 may include one or more of a programmable chip, a processor, a memory, and a network interface. For example, the transmit power based clear channel assessment circuit may include the processor 204 or the selective CCA circuit 228. In some implementations, a means for transmit power based clear channel assessment circuit may include the transmit power based clear channel assessment circuit 1455.

Device 1450 may be further configured to include a channel availability circuit 1460. The channel availability circuit 1460 may be configured to perform one or more of the functions of block 1410 and/or 1415 discussed above. The channel availability circuit 1460 may include one or more of a programmable chip, a processor, a memory, and a network interface. For example, the channel availability circuit 1460 may include the processor 204. In some implementations, a means for determining channel availability may include the transmit channel availability circuit 1460.

Device 1450 may be further configured to include a transmission power determining circuit 1465. The transmission power determining circuit 1465 may be configured to perform one or more of the functions of block 1420 and/or 1425 discussed above. The transmission power determining circuit 1465 may include one or more of a programmable chip, a processor, a memory, and a network interface. For example, the transmission power determining circuit 1465 may include the processor 204. In some implementations, a means for determining a transmission power may include the transmission power determining circuit 1465.

Device 1450 may be further configured to include a variable power transmission circuit 1470. The variable power transmission circuit 1470 may be configured to perform one or more of the functions of block 1420 and/or 1425 discussed above. The variable power transmission circuit 1470 may include one or more of a programmable chip, a processor, a memory, and a network interface. For example, the variable power transmission circuit 1470 may include the transmitter 210. In some implementations, a means for transmitting at a power level may include the variable power transmission circuit 1470.

In some implementations, the variable power transmitting circuit 1470 may be configured to perform one or more of the functions discussed above with respect to blocks 1420 and 1425. The variable power transmitting circuit 1470 may include one or more of a programmable chip, a processor, a memory, and a network interface. For example, the transmitting circuit may include the transmitter 210. In some implementations, a means for transmitting a message with a particular transmit power may include the variable power transmitting circuit 1470.

Figure 15A:
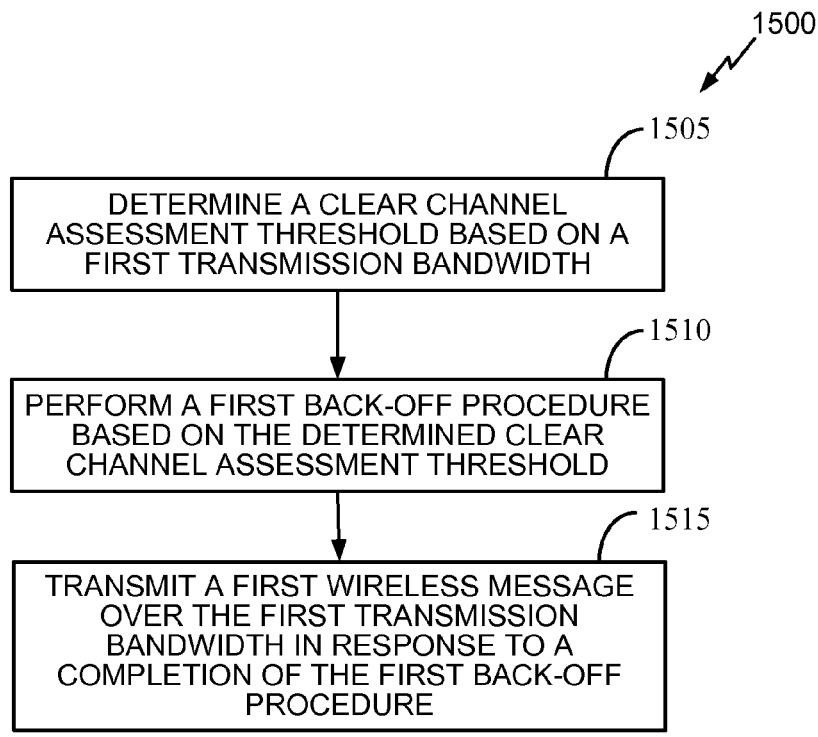
FIG. 15A illustrates one example implementation of a method of clear channel assessment on a wireless network.

FIG. 15A illustrates one example implementation of a method of clear channel assessment on a wireless network. In one aspect, process 1500 may be performed by the wireless device 202 illustrated in FIG. 2. For example, in some aspects, blocks 1505-1510 may be performed by the processor 204 while block 1515 is performed by the transmitter 210.

As discussed above, in some aspects, clear channel assessment thresholds may be based on the transmission bandwidth. For example, a transmission over a wider transmission bandwidth injects more energy into the network than a transmission over a narrower transmission bandwidth. Therefore, in some aspects, a transmission over the wider transmission bandwidth may utilize a back-off procedure that utilizes lower CCA thresholds than a back-off procedure that precedes a transmission over a narrower bandwidth. By tuning (via CCA thresholds particular to a transmission bandwidth) the sensitivity of a back-off procedure based on an amount of energy to be injected onto a wireless network (i.e. based on the transmission bandwidth), a clear channel assessment strategy may more fairly allocate the wireless medium to devices utilizing differing transmission parameters.

In block 1505, a clear channel assessment threshold is determined based on a first transmission bandwidth. The first transmission bandwidth may be an intended transmission bandwidth for a first message. The determined clear channel assessment threshold may be associated with the first transmission bandwidth, and the determination may be based on the association. For example, a device performing process 1500 may receive an association between the first transmission bandwidth and the determined clear channel assessment threshold via communications with an access point. In some aspects, devices on a wireless network may receive one or more mappings of transmission frequencies and/or transmission powers to a particular clear channel assessment threshold from another wireless device, such as an access point. In some aspects, devices on the wireless network, such as a device performing process 1500, may hard code mappings of transmission frequencies/powers to CCA thresholds. These mappings may be based on specifications provided by, for example, an industry standard, such as an 802.11 standard.

The clear channel assessment threshold may be utilized to detect one or more conditions on a wireless medium. An energy level on the wireless medium may be compared to the clear channel assessment threshold. If the energy level is above the CCA threshold, a condition may be determined to be present. If the energy level is below the CCA threshold, the condition may be determined to be not present.

One clear channel assessment threshold is a packet detection threshold. The packet detection threshold may be used by some back-off procedures to determine whether a packet is being transmitted over the wireless medium. For example, if a signal level of the wireless medium exceeds the packet detection threshold, the signal may be decoded to identify or detect a packet or at least a packet preamble. Some back-off procedures may determine whether a wireless medium is idle based on whether a packet is detected on the medium or not.

Another clear channel assessment threshold may be an energy detection threshold. The energy detection threshold may be compared to an energy level of a wireless medium to determine whether the wireless medium is idle. In some aspects, an energy detection threshold may be used to determine whether non-802.11 wireless transmissions are occurring on the wireless medium. Some back-off procedures may determine whether a wireless medium is idle based on whether an energy level of the wireless medium is above the energy detection threshold. In some aspects, a clear channel assessment threshold is a mid-packet detection threshold. A mid-packet detection threshold may be used to determine whether a packet is being transmitted on the network. A wireless medium's energy level relative to a mid-packet detection threshold may be utilized to determine whether the wireless medium is idle in some implementations.

In block 1510, a back off procedure is performed based on the determined clear channel assessment threshold. For example, the back-off procedure may utilize the determined clear channel assessment threshold to determine whether a wireless medium is idle. As discussed above, if an energy level of the wireless medium is below the threshold, the wireless medium may be determined to be idle. In some aspects, an energy level of the wireless medium may be compared to a set of thresholds. In these aspects, whether the wireless medium is idle may be based on the wireless medium's energy level relative to the set of thresholds.

If the wireless medium is determined to be idle, the back-off algorithm may advance. In some aspects, this may include decrementing a back-off counter towards a terminating condition. If the medium is determined to not be idle, the back-off procedure may not advance, but may "loop," and continue to wait for a period of time, before an additional idle determination is performed. FIG. 9A provides one example of a back-off procedure that utilizes a clear channel assessment threshold. For example, both the first energy threshold and second energy threshold discussed with respect to FIG. 9A may be considered clear channel assessment thresholds. Process 900 may be considered a back-off procedure in some aspects (except block 945).

In some aspects, a second back-off procedure may be performed in response to a completion of the first back-off procedure. For example, after the first back-off procedure completes, the first transmission bandwidth may be determined to still be unavailable. Some implementations may then initiate a second back-off procedure based on a second transmission frequency. For example, an implementation may first attempt to transmit over a broad transmission bandwidth. If, after completing a back-off procedure associated with the broad transmission bandwidth, the broad transmission bandwidth is unavailable, a narrower transmission bandwidth may be selected. A back-off procedure associated with the narrower transmission bandwidth may then be performed. After completion of this second back-off procedure, a message may be transmitted over the narrower bandwidth if it is determined to be available after its corresponding back-off procedure has been completed.

In some aspects, a first and second sub-back off procedure may be performed at least partially in parallel. Each of the sub-back-off procedure may be based on a different transmission bandwidth. For example, as shown in FIG. 10A, block 1005a performs a back-off based on a first energy threshold that corresponds to a first transmission bandwidth, while block 1005b performs a back-off procedure based on a second energy threshold that corresponds to a second transmission bandwidth. In some aspects, when a first of the at least two sub-back off procedure completes, a message is transmitted over a transmission bandwidth corresponding to the first sub-back off procedure (or corresponding to a CCA threshold used by the first sub-back off procedure).

In block 1515, a first wireless message is transmitted in response to a completion of the first back-off procedure. In some aspects, the first back-off procedure may be considered complete when a back-off counter associated with the first back-off procedure reaches a termination threshold. In some aspects, the termination threshold may be zero. For example, in the example of FIG. 9A, the back-off procedure completes when the "yes" branch of decision block 940 is taken.

Figure 15B:
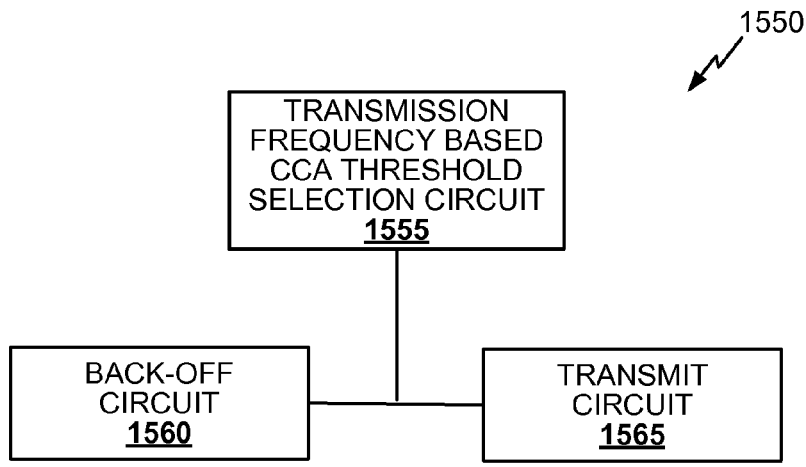
FIG. 15B is a functional block diagram of a wireless apparatus that may be employed within the wireless communication system of FIG. 2.

FIG. 15B is a functional block diagram of a wireless apparatus that may be employed within the wireless communication device 202 of FIG. 2. Those skilled in the art will appreciate that a wireless communication apparatus may have more components than the simplified wireless communication apparatus 1550 shown in FIG. 15B. The wireless communication apparatus 1550 shown includes only those components useful for describing some prominent features of implementations within the scope of the claims. The wireless communication apparatus 1550 may include a transmission frequency based clear channel assessment threshold selection circuit 1555, a back-off circuit 1560, and a transmission circuit 1565.

In some implementations, the transmission frequency based clear channel assessment threshold selection circuit 1555 may be configured to perform one or more of the functions discussed above with respect to block 1505. The transmission frequency based clear channel assessment threshold selection circuit 1555 may include one or more of a programmable chip, a processor, a memory, and a network interface. For example, the transmission frequency based clear channel assessment threshold selection circuit 1555 may include the processor 204 or the selective CCA circuit 228. In some implementations, a means for determining a CCA threshold based on a transmit frequency may include the transmission frequency based clear channel assessment threshold selection circuit 1555.

In some implementations, the back-off circuit 1560 may be configured to perform one or more of the functions discussed above with respect to block 1510. The back-off circuit 1560 may include one or more of a programmable chip, a processor, a memory, and a network interface. For example, the back-off circuit 1560 may include the processor 204 or the selective CCA circuit 228. In some implementations, a means for performing a back-off procedure may include the back-off circuit 1560.

In some implementations, the transmit circuit 1565 may be configured to perform one or more of the functions discussed above with respect to block 1515. The transmit circuit 1565 may include one or more of a programmable chip, a processor, a memory, and a network interface. For example, the transmit circuit 1565 may include the transmitter 210. In some implementations, a means for transmitting may include the transmit circuit 1565.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of clear channel assessment on a wireless network, comprising:
determining, by an electronic device, a first transmission bandwidth for a first wireless message;
determining, by the electronic device, a clear channel assessment (CCA) threshold based on the first transmission bandwidth for the first wireless message;
performing, by the electronic device, a first back-off procedure based on the determined clear channel assessment threshold to determine if the first transmission bandwidth is available for transmission of the first wireless message, wherein the first back-off procedure comprises performing at least two sub-back-off procedures at least partially in parallel, each sub-back-off procedure utilizing a different frequency range to detect energy or to detect a packet; and
transmitting, by the electronic device, the first wireless message over the first transmission bandwidth in response to a completion of the first back-off procedure.

2. The method of claim 1, further comprising:
determining a packet detection energy threshold based on the first transmission bandwidth, wherein performing the first back-off procedure comprises:
detecting whether a packet is being transmitted on the wireless network based on the packet detection energy threshold, and
determining whether the first transmission bandwidth is idle based on whether a packet is detected.

3. The method of claim 1, further comprising:
determining a first energy threshold based on the first transmission bandwidth, wherein performing the first back-off procedure comprises:
determining whether a received wireless network energy level at the first transmission bandwidth is below the first energy threshold, and determining whether the first transmission bandwidth is idle based on whether the energy level is below the first energy threshold.

4. The method of claim 1, further comprising:
completing a first of the at least two sub-back off procedures; and
transmitting the first wireless message over a transmission bandwidth corresponding to the first sub-back-off procedure in response to a completion of the first sub-back-off procedure.

5. The method of claim 1, wherein performing the first back-off procedure comprises:
in response to completion of the first back-off procedure, determining whether the first transmission bandwidth is available, wherein the first wireless message is transmitted at the first transmission bandwidth if it is available;
if the first transmission bandwidth is not available, performing a second back-off procedure based on a second transmission bandwidth lower than the first transmission bandwidth; and
in response to completion of the second back-off procedure, determining whether the second transmission bandwidth is available, wherein the first wireless message is transmitted at the second transmission bandwidth if it is available.

6. An apparatus for clear channel assessment on a wireless network, comprising:
an electronic hardware processor configured to:
determine a first transmission bandwidth for a first wireless message;
determine a clear channel assessment (CCA) threshold based on the first transmission bandwidth for the first wireless message;
perform a first back-off procedure based on the determined clear channel assessment threshold to determine if the first transmission bandwidth is available for transmission of the first wireless message, wherein the electronic hardware processor is configured to perform the first back-off procedure by performing at least two sub-back-off procedures at least partially in parallel, each sub-back-off procedure utilizing a different frequency range to detect energy or to detect a packet; and
a transmitter configured to transmit the first wireless message over the first transmission bandwidth in response to a completion of the first back-off procedure.

7. The apparatus of claim 6, wherein the electronic hardware processor is further configured to:
determine a packet detection energy threshold based on the first transmission bandwidth, wherein the processor is configured to perform the first back-off procedure by:
detect whether a packet is being transmitted on the wireless network based on the packet detection energy threshold, and
determine the first transmission bandwidth is idle if a packet is not detected.

8. The apparatus of claim 6, wherein the electronic hardware processor is further configured to:
determine a first energy threshold based on the first transmission bandwidth, wherein the processor is further configured to perform the first back-off procedure by:
determine whether a received wireless network energy level at the first transmission bandwidth is below the first energy threshold, and determine the first transmission bandwidth is idle if the energy level is below the first energy threshold.

9. The apparatus of claim 6, wherein the electronic hardware processor is further configured to:
complete a first of the at least two sub-back off procedures; and
transmit the first wireless message over a transmission bandwidth corresponding to the first sub-back-off procedure in response to a completion of the first sub-back-off procedure.

10. The apparatus of claim 6, wherein the electronic hardware processor is configured to perform the first back-off procedure by:
determining whether the first transmission bandwidth is available in response to completion of the first back-off procedure;
transmitting the first wireless message at the first transmission bandwidth if it is determined to be available;
if the first transmission bandwidth is not available, performing a second back-off procedure based on a second transmission bandwidth lower than the first transmission bandwidth;
determining whether the second transmission bandwidth is available in response to completion of the second back-off procedure; and
transmitting the first wireless message at the second transmission bandwidth if it is determined to be available.

11. An apparatus for clear channel assessment on a wireless network, comprising:
means for determining a first transmission bandwidth for a first wireless message;
means for determining a clear channel assessment (CCA) threshold based on the first transmission bandwidth for the first wireless message;
means for performing a first back-off procedure based on the determined clear channel assessment threshold to determine if the first transmission bandwidth is available for transmission of the first wireless message, wherein the means for performing the first back-off procedure is configured to perform at least two sub-back-off procedures at least partially in parallel, each sub-back-off procedure utilizing a different frequency range to detect energy or to detect a packet; and
means for transmitting the first wireless message over the first transmission bandwidth in response to a completion of the first back-off procedure.

12. The apparatus of claim 11, further comprising:
means for determining a packet detection energy threshold based on the first transmission bandwidth, wherein the means for performing the first back-off procedure is configured to:
detect whether a packet is being transmitted on the wireless network based on the packet detection energy threshold; and
determine the first transmission bandwidth is idle if a packet is not detected.

13. The apparatus of claim 11, further comprising:
means for determining a first energy threshold based on the first transmission bandwidth, wherein the means for performing the first back-off procedure is configured to:
determine whether a received wireless network energy level at the first transmission bandwidth is below the first energy threshold; and
determine the first transmission bandwidth is idle if the energy level is below the first energy threshold.

14. A computer readable non-transitory storage medium comprising instructions that when executed cause a processor to perform a method of clear channel assessment on a wireless network, the method comprising:
- determining a first transmission bandwidth for a first wireless message;
- determining, by the electronic device, a clear channel assessment (CCA) threshold based on the first transmission bandwidth for the first wireless message;
- performing a first back-off procedure based on the determined clear channel assessment threshold to determine if the first transmission bandwidth is available for transmission of the first wireless message, wherein the first back-off procedure comprises performing at least two sub-back-off procedures at least partially in parallel, each sub-back-off procedure utilizing a different frequency range to detect energy or to detect a packet; and
- transmitting the first wireless message over the first transmission bandwidth in response to a completion of the first back-off procedure.

15. The computer readable storage medium of claim 14, the method further comprising:
- determining a packet detection energy threshold based on the first transmission bandwidth, wherein performing the first back-off procedure comprises:
- detecting whether a packet is being transmitted on the wireless network based on the packet detection energy threshold, and
- determining the first transmission bandwidth is idle if a packet is not detected.

16. The computer readable storage medium of claim 14, the method further comprising:
- determining a first energy threshold based on the first transmission bandwidth, wherein performing the first back-off procedure comprises:
- determining whether a received wireless network energy level at the first transmission bandwidth is below the first energy threshold, and
- determining the first transmission bandwidth is idle if the energy level is below the first energy threshold.

* * * * *